United States Patent
Ueda et al.

(10) Patent No.: US 12,117,466 B2
(45) Date of Patent: Oct. 15, 2024

(54) SENSOR DEVICE

(71) Applicant: Panasonic Intellectual Property Management Co., Ltd., Osaka (JP)

(72) Inventors: Hideki Ueda, Osaka (JP); Koichiro Nakashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 270 days.

(21) Appl. No.: 17/882,309

(22) Filed: Aug. 5, 2022

(65) Prior Publication Data

US 2023/0076794 A1    Mar. 9, 2023

(30) Foreign Application Priority Data

Sep. 3, 2021  (JP) ................................. 2021-144326

(51) Int. Cl.
| | |
|---|---|
| *G01P 3/483* | (2006.01) |
| *G01P 15/08* | (2006.01) |
| *G01P 15/125* | (2006.01) |

(52) U.S. Cl.
CPC ............ *G01P 3/483* (2013.01); *G01P 15/125* (2013.01); *G01P 2015/0831* (2013.01)

(58) Field of Classification Search
CPC .................. G01P 3/483; G01P 15/125; H01L 2224/32145; H01L 2224/73265; H01L 2924/1461; B81B 2201/025; B81B 7/0048; B81B 7/0074
See application file for complete search history.

(56) References Cited

U.S. PATENT DOCUMENTS

| | | | | |
|---|---|---|---|---|
| 5,996,409 | A  * | 12/1999 | Funk ..................... | G01P 15/125 73/504.04 |
| 7,339,265 | B2 * | 3/2008 | Kitao .................... | G01P 15/125 257/784 |
| 2006/0238961 | A1* | 10/2006 | Saita ....................... | H01L 23/50 257/E23.079 |
| 2009/0146227 | A1* | 6/2009 | Igarashi ................ | G01P 15/125 257/E29.324 |

(Continued)

FOREIGN PATENT DOCUMENTS

JP    2009-076588 A    4/2009

*Primary Examiner* — Steven L Yeninas
(74) *Attorney, Agent, or Firm* — Rimon P.C.

(57) ABSTRACT

A sensor device includes a conductive layer. The conductive layer is interposed between a first principal surface of an IC chip and a sensor element and faces the sensor element via a resin-based adhesive layer. The sensor element includes: a moving part including a moving electrode; a fixed part including a fixed electrode forming capacitance between the moving electrode and itself; a first terminal connected to the moving electrode; and a second terminal connected to the fixed electrode. The IC chip includes: a signal processor that processes a detection signal from the second terminal; a first voltage generator that generates a first voltage as an operating voltage for the processor; and a second voltage generator that generates a second voltage corresponding to the sensor element's reference potential applied to the first terminal. The conductive layer is electrically connected to the first terminal.

20 Claims, 11 Drawing Sheets

(56) References Cited

U.S. PATENT DOCUMENTS

| | | | | |
|---|---|---|---|---|
| 2013/0340525 A1* | 12/2013 | Liu | ................ | G01C 19/574 |
| | | | | 73/514.11 |
| 2013/0340526 A1* | 12/2013 | Liu | ................ | G01C 19/5769 |
| | | | | 73/514.32 |
| 2018/0149677 A1* | 5/2018 | Milano | ................ | G01R 15/148 |
| 2018/0372773 A1* | 12/2018 | Matsuura | ................ | G01P 15/0894 |

* cited by examiner

SENSOR DEVICE

CROSS-REFERENCE TO RELATED APPLICATIONS

The present application is based upon, and claims the benefit of priority to, Japanese Patent Application No. 2021-144326, filed on Sep. 3, 2021, the entire contents of which are hereby incorporated by reference.

TECHNICAL FIELD

The present disclosure generally relates to a sensor device and more particularly relates to a sensor device including a sensor element.

BACKGROUND ART

JP 2009-76588 A discloses a known sensor device in which a sensor chip (sensor element) is mounted on, and integrated with, an ASIC (IC chip). The sensor chip may be, for example, an acceleration sensor unit. The sensor chip is a micro-electro-mechanical systems (MEMS) element. The sensor chip includes a weight, a frame portion, and a beam portion.

According to JP 2009-76588 A, the sensor chip is fixed to the surface of the ASIC via an adhesive layer. As the adhesive layer, an epoxy-based adhesive or a polyimide-based adhesive may be used, for example. The sensor chip and the ASIC are electrically connected together via bonding wires.

In a sensor device including an adhesive layer between a sensor element and an IC chip as in the configuration disclosed in JP 2009-76588 A, the sensor characteristics of the sensor element sometimes vary depending on a variation in the physical properties of the adhesive layer.

SUMMARY

The present disclosure provides a sensor device with the ability to reduce such a variation in the sensor characteristics of the sensor element.

A sensor device according to an aspect of the present disclosure includes an IC chip, a sensor element, a resin-based adhesive layer, and a conductive layer. The IC chip has a first principal surface and a second principal surface. The sensor element is disposed over the first principal surface of the IC chip. The resin-based adhesive layer is interposed between the first principal surface of the IC chip and the sensor element. The conductive layer is interposed between the first principal surface of the IC chip and the sensor element and faces the sensor element via the resin-based adhesive layer. The sensor element includes: a moving part including a moving electrode; a fixed part including a fixed electrode that forms electrostatic capacitance between the moving electrode and the fixed electrode itself; a first terminal connected to the moving electrode; and a second terminal connected to the fixed electrode. The IC chip includes: a signal processor that processes a detection signal supplied from the second terminal; a first voltage generator that generates a first voltage as an operating voltage for the signal processor; and a second voltage generator that generates a second voltage corresponding to the sensor element's reference potential to be applied to the first terminal. The conductive layer is electrically connected to the first terminal.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Note that the drawings to be referred to in the following description of first to third embodiments are all schematic representations. That is to say, the ratio of the dimensions (including thicknesses) of respective constituent elements illustrated on the drawings does not always reflect their actual dimensional ratio.

First Embodiment

A sensor device 500 according to a first embodiment will be described with reference to FIGS. 1-6.

(1) Overview

Figure 1:
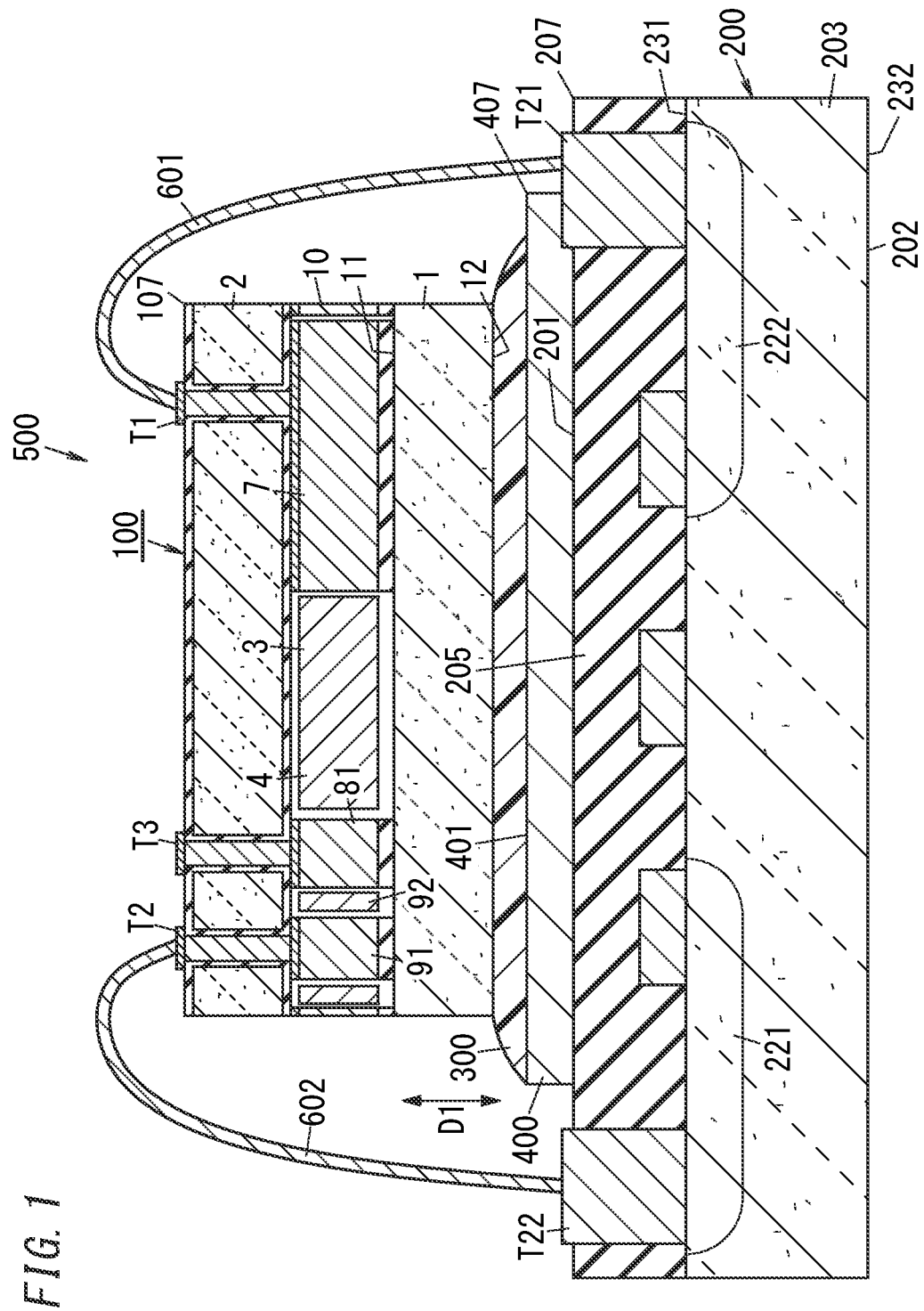
FIG. 1 is a cross-sectional view of a sensor device according to a first embodiment.

A sensor device 500 according to the first embodiment includes an IC chip 200, a sensor element 100, a resin-based adhesive layer 300, and a conductive layer 400 as shown in FIG. 1. The IC chip 200 has a first principal surface 201 and a second principal surface 202. The sensor element 100 is disposed over the first principal surface 201 of the IC chip 200. The resin-based adhesive layer 300 is interposed between the first principal surface 201 of the IC chip 200 and the sensor element 100. The conductive layer 400 is interposed between the first principal surface 201 of the IC chip 200 and the sensor element 100 and faces the sensor element 100 via the resin-based adhesive layer 300. The sensor element 100 includes: a moving part 3 including a moving electrode 92; a fixed part 10 including a fixed electrode 91 that forms electrostatic capacitance between the moving electrode 92 and the fixed electrode 91 itself; a first terminal T1 connected to the moving electrode 92; and a second terminal T2 connected to the fixed electrode 91. The IC chip 200 includes: a signal processor 211 (see FIG. 6) that processes a detection signal supplied from the second terminal T2; a first voltage generator 221 (see FIG. 6) that generates a first voltage as an operating voltage (of 1 V, for example) for the signal processor 211; and a second voltage generator 222 (see FIG. 6) that generates a second voltage corresponding to the sensor element's 100 reference potential (of 20 V, for example) to be applied to the first terminal T1. The conductive layer 400 is electrically connected to the first terminal T1.

In the sensor device 500, the sensor element 100 is an angular velocity sensor element for transforming an angular velocity into an electrical signal. In the sensor element 100, the fixed part 10 further includes a driving electrode 81 (hereinafter referred to as a "first driving electrode 81"). The driving electrode 81 drives the moving part 3. As used herein, "to drive the moving part 3" means vibrating the moving part 3. The sensor element 100 includes a third terminal T3 connected to the first driving electrode 81. The IC chip 200 further includes a driving controller 212 (see FIG. 6) that outputs a drive signal to the third terminal T3.

The sensor device 500 includes a plurality of connection members that electrically connect the sensor element 100 to the IC chip 200. The plurality of connection members includes a first connection member 601, a second connection member 602, and a third connection member 603 (see FIG. 6).

In the sensor element 100, the electrostatic capacitance of a capacitor including the fixed electrode 91 (first detection electrode 91) and the moving electrode 92 (second detection electrode 92) varies according to the angular velocity acting on the sensor element 100.

(2) Details

A configuration for the sensor device 500 according to the first embodiment will be described in detail with reference to FIGS. 1-6.

(2.1) Sensor Element

The sensor element 100 includes a fixed part 10 and a moving part 3 as shown in FIGS. 2-5. The fixed part 10 includes a first substrate 1, a second substrate 2 (see FIGS. 3-5), a spacer portion 15, a plurality of (e.g., four) supporting portions 7, a plurality of (e.g., four) first detection electrodes 91 (fixed electrodes 91), and a plurality of (e.g., four) first driving electrodes 81. The moving part 3 is provided between, and out of contact with, the first substrate 1 and the second substrate 2. The moving part 3 includes a weight 4, a plurality of (e.g., eight) first elastic portions 51, a plurality of (e.g., eight) second elastic portions 52, a plurality of (e.g., four) frame portions 6, a plurality of (e.g., four) second detection electrodes 92 (moving electrodes 92), and a plurality of (e.g., four) second driving electrodes 82. The sensor element 100 has a square shape when viewed in plan in a thickness direction D1 defined for the first substrate 1. In other words, the outer peripheral edges 107 of the sensor element 100 form a square when viewed in plan in the thickness direction D1 defined for the first substrate 1. The sensor element 100 does not have to be square but may also be rectangular, for example, when viewed in plan in the thickness direction D1 defined for the first substrate 1.

Figure 2:
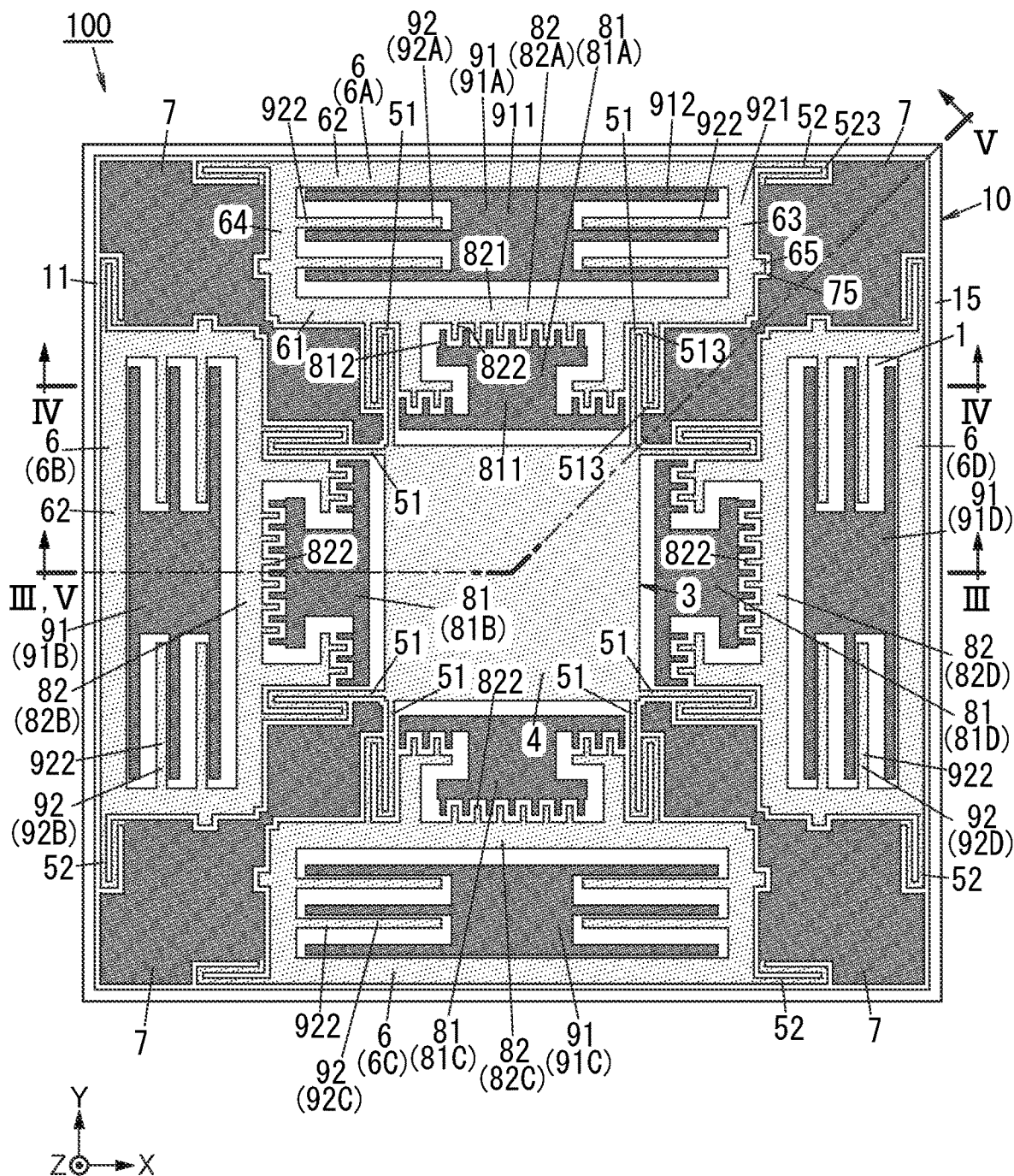
FIG. 2 is a plan view of a sensor element included in the sensor device.

Note that in FIG. 2, illustration of the second substrate 2 is omitted. Also, in FIG. 2, constituent elements fixed to the first substrate 1 and constituent elements not fixed to the first substrate 1 are hatched in dots with two different shades to be distinguished from each other. Specifically, the constituent elements hatched in dots with the denser shade in FIG. 2 (namely, the plurality of supporting portions 7, the plurality of first driving electrodes 81, and the plurality of first detection electrodes 91) are fixed to the first substrate 1. On the other hand, the constituent elements hatched in dots with the less dense shade (namely, the weight 4, the plurality of first elastic portions 51, the plurality of second elastic portions 52, the plurality of frame portions 6, the plurality of second driving electrodes 82, and the plurality of second detection electrodes 92) are not fixed to the first substrate 1.

In the following description, an orthogonal coordinate system with three axes that intersect with each other at right angles (namely, an X-axis, a Y-axis, and a Z-axis) is defined as an example. Particularly, the "Z-axis" is supposed to be an axis aligned with the thickness direction D1 defined for the first substrate 1 (and the thickness direction defined for the weight 4), the "X-axis" is supposed to be an axis aligned with a direction in which the weight 4 is caused to vibrate (i.e., is driven), and the "Y-axis" is supposed to be an axis that intersects with both the Z- and X-axes at right angles. The axis aligned with the direction in which the weight 4 is caused to vibrate (or driven) does not have to be the X-axis but may also be the Y-axis. Note that each of the X-, Y-, and Z-axes is a virtual axis and the arrows indicating X, Y, and Z on the drawings are shown there just for the sake of convenience of description and are all insubstantial ones. The origin of this orthogonal coordinate system may be defined, for example, at the center of the moving part 3 (e.g., at the center of the weight 4 in the example illustrated in FIG. 2) when viewed in plan in the thickness direction D1 defined for the first substrate 1.

The sensor element 100 may be designed to detect, for example, an angular velocity around the Z-axis (i.e., the center axis of the weight 4) as its target of detection. The sensor element 100 outputs an electrical signal representing the angular velocity around the Z-axis. The sensor element 100 is implemented as a vibration type gyrosensor and configured to detect an angular velocity around the Z-axis by using the Coriolis force (deflecting force). That is to say, the sensor element 100 detects the angular velocity applied to the weight 4 of the sensor element 100 by detecting the Coriolis force produced upon the application of external rotational force to the weight 4 with the weight 4 allowed to vibrate. For example, in a situation where the weight 4 is driven and vibrating in the X-axis direction with the electrostatic force produced between the first driving electrodes 81 and the second driving electrodes 82, if angular velocity around the Z-axis is input to the sensor element 100, then the sensor element 100 may have the first detection electrodes 91 and the second detection electrodes 92 arranged in the Y-axis direction detect the angular velocity.

Figure 3:
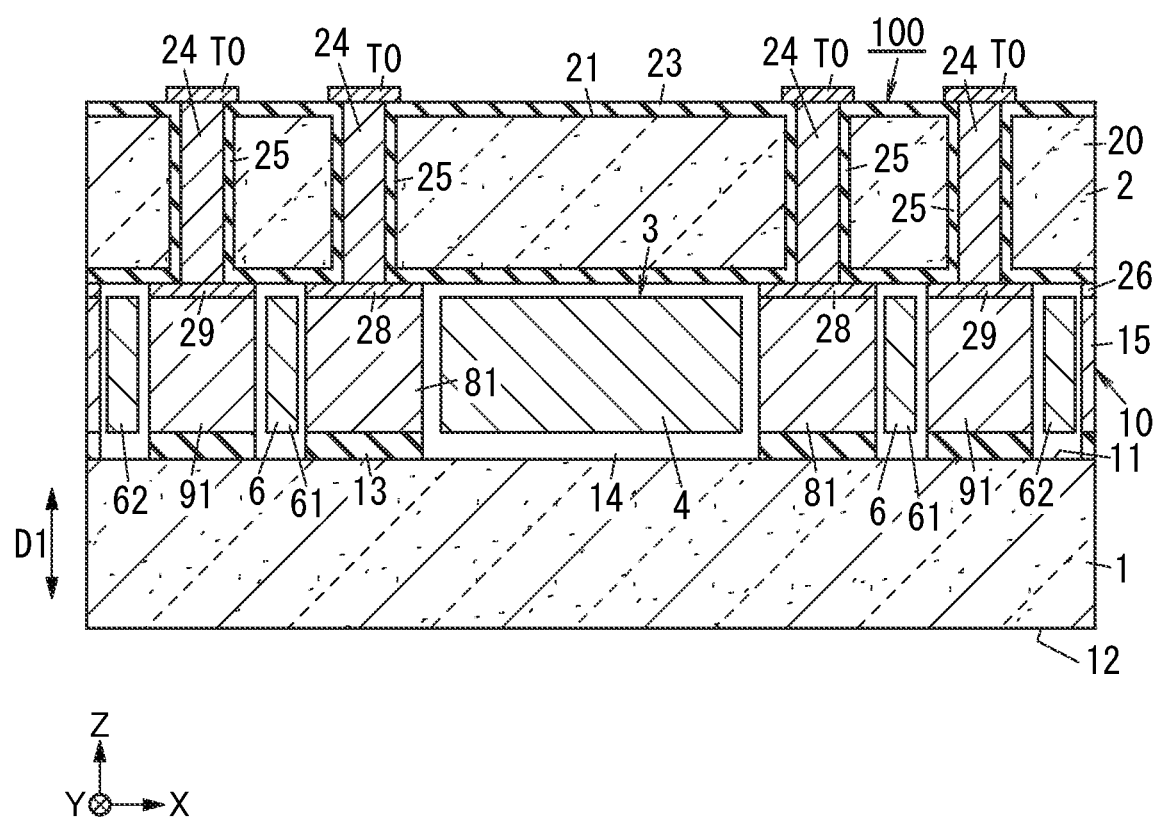
FIG. 3 is a cross-sectional view illustrating the sensor element of the sensor device and taken along the plane shown in FIG. 2.
Figure 4:
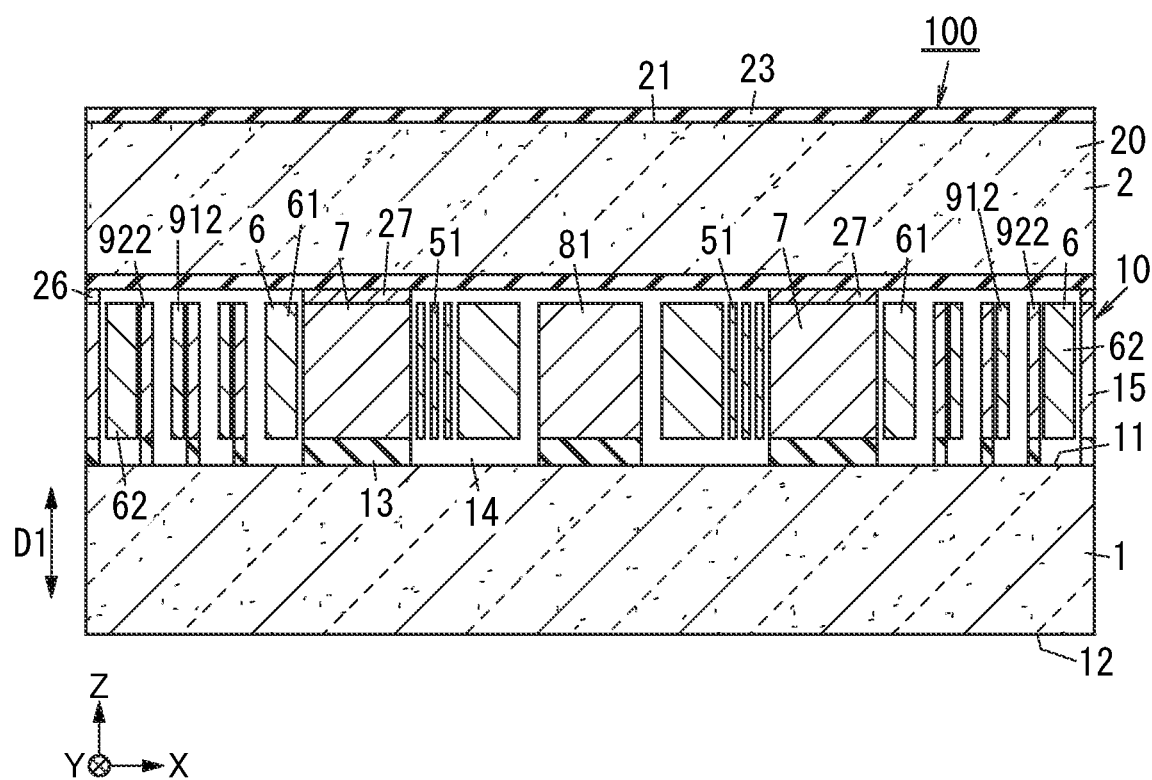
FIG. 4 is a cross-sectional view illustrating the sensor element of the sensor device and taken along the plane IV-IV shown in FIG. 2.
Figure 5:
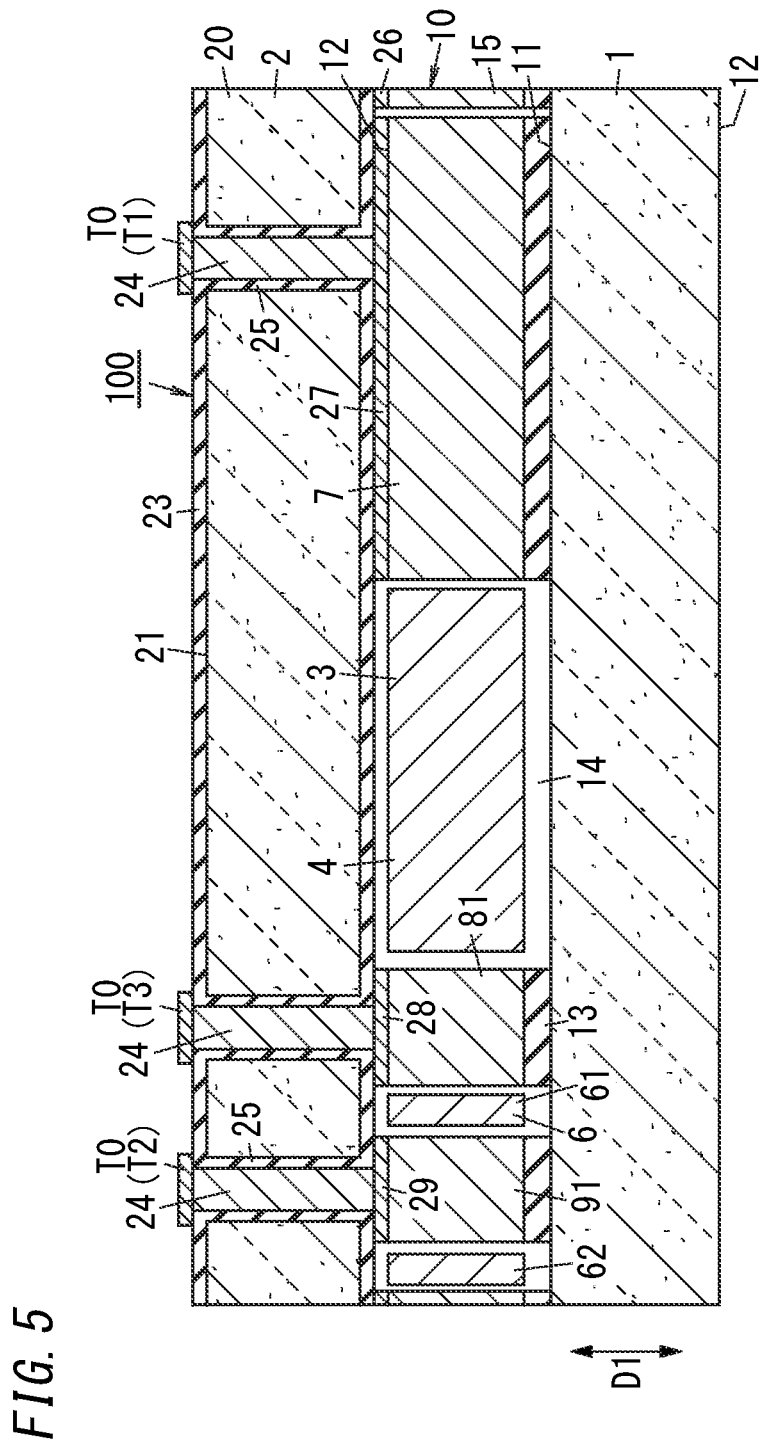
FIG. 5 is a cross-sectional view illustrating the sensor element of the sensor device and taken along the plane V-V shown in FIG. 2.

The first substrate 1 has a first principal surface 11 and a second principal surface 12, which is opposite from the first principal surface 11, as shown in FIGS. 3-5. The first substrate 1 may be, for example, square, but may also be rectangular, when viewed in plan in the thickness direction D1 defined for the first substrate 1. The first substrate 1 may include, for example, a first silicon substrate.

The second substrate 2 faces the first principal surface 11 of the first substrate 1 in the thickness direction D1 defined for the first substrate 1 as shown in FIGS. 3-5. When viewed in plan in the thickness direction D1 defined for the first substrate 1, the second substrate 2 has the same shape as the first substrate 1. The second substrate 2 may have different external dimensions from the first substrate 1. The second substrate 2 may include, for example, a second silicon substrate 20. The second substrate 2 includes, for example, an insulating film 23 formed on a principal surface 21, opposite from the first substrate 1, of the second silicon substrate 20, a plurality of terminals T0 (external connection electrodes) formed on the insulating film 23, and a plurality of through interconnects 24 formed along the thickness of the second silicon substrate 20 and connected one to one to the plurality of terminals T0. The plurality of terminals T0 includes a first terminal T1, a second terminal T2, and a third terminal T3 (see FIG. 5). The plurality of through interconnects 24 and the second silicon substrate 20 are electrically insulated from each other by, for example, an insulating film 25 interposed between the through interconnects 24 and the second silicon substrate 20.

The spacer portion 15 is provided between the first substrate 1 and the second substrate 2. The spacer portion 15 has the shape of a frame aligned with the respective outer peripheral edges of the first substrate 1 and the second substrate 2. The spacer portion 15 is fixed to the first substrate 1 and the second substrate 2. The sensor element 100 includes a bonding portion 26 that bonds the spacer portion 15 and the second substrate 2 together. When viewed in plan in the thickness direction D1 defined for the first substrate 1, the bonding portion 26 has the shape of a rectangular frame aligned with the outer peripheral edges of the first substrate 1. The bonding portion 26 has electrical conductivity. A material for the bonding portion 26 includes a metal.

The plurality of (e.g., four) supporting portions 7 are fixed to the first substrate 1 and the second substrate 2. The sensor element 100 includes a plurality of bonding portions 27 that bond the plurality of supporting portions 7 and the second substrate 2 together. The plurality of bonding portions 27 has electrical conductivity. A material for the plurality of bonding portions 27 includes a metal. Each of the plurality of bonding portions 27 is electrically connected to an associated one T0 of the plurality of terminals T0 via an associated one 24 of the plurality of through interconnects 24. As shown in FIG. 1, the four supporting portions 7 are respectively arranged one by one at the four corners of the first substrate 1 when viewed in plan in the thickness direction D1 defined for the first substrate 1. The four supporting portions 7 are located inside the spacer portion 15 when viewed in plan in the thickness direction D1 defined for the first substrate 1. The four supporting portions 7 support the moving part 3 to allow the moving part 3 to swing.

The plurality of (e.g., four) first detection electrodes 91 (fixed electrodes 91) and the plurality of (e.g., four) first driving electrodes 81 are fixed to the first substrate 1 and the second substrate 2. The plurality of (e.g., four) first detection electrodes 91 (fixed electrodes 91) and the plurality of (e.g., four) first driving electrodes 81 are located inside the spacer portion 15 when viewed in plan in the thickness direction D1 defined for the first substrate 1. The plurality of first detection electrodes 91 are fixed to the first substrate 1 and the second substrate 2. The sensor element 100 includes a plurality of bonding portions 29 that bond the plurality of first detection electrodes 91 and the second substrate 2 together. The plurality of bonding portions 29 has electrical conductivity. A material for the plurality of bonding portions 29 may be the same as the material for the plurality of bonding portions 27. Each of the plurality of bonding portions 29 is electrically connected to an associated one T0 of the plurality of terminals T0 via an associated one 24 of the plurality of through interconnects 24. The plurality of first driving electrode 81 are fixed to the first substrate 1 and the second substrate 2. The sensor element 100 includes a plurality of bonding portions 28 that bond the plurality of first driving electrodes 81 and the second substrate 2 together. The plurality of bonding portions 28 has electrical conductivity. A material for the plurality of bonding portions 28 may be the same as the material for the plurality of bonding portions 27. Each of the plurality of bonding portions 28 is electrically connected to an associated one T0 of the plurality of terminals T0 via an associated one 24 of the plurality of through interconnects 24.

In the sensor element 100, the outer peripheral edges of the weight 4 form a polygonal (e.g., square) shape when viewed in plan in the thickness direction D1 defined for the first substrate 1. The sensor element 100 has multiple (e.g., four) sets, each of which includes associated two of the first elastic portions 51, associated two of the second elastic portions 52, an associated one of the frame portions 6, an associated one of the first driving electrodes 81, an associated one of the second driving electrodes 82, an associated one of the first detection electrodes 91, and an associated one of the second detection electrodes 92. The multiple sets are arranged such that an associated one the second driving electrodes 82 faces each side (i.e., each outer peripheral edge) of the weight 4 one to one. The multiple sets are arranged to be rotationally symmetric to each other with respect to the center axis of the weight 4, aligned with the thickness direction D1 defined for the first substrate 1, as the rotational axis.

The four frame portions 6 are located inside the spacer portion 15 when viewed in plan in the thickness direction D1 defined for the first substrate 1. The four frame portions 6 are arranged to surround the weight 4 when viewed in plan in the thickness direction D1 defined for the first substrate 1. Specifically, two out of the four frame portions 6 are respectively arranged on both sides of the weight 4 in the Y-axis direction and the other two frame portions 6 are respectively arranged on both sides of the weight 4 in the X-axis direction. The respective frame portions 6 are out of contact with the weight 4.

Each of the frame portions 6 and the weight 4 are arranged side by side, and are displaceable, in a predetermined direction that intersects at right angles with the thickness direction D1 defined for the first substrate 1. In the sensor element 100, the predetermined direction in which each of the plurality of frame portions 6 and the weight 4 are arranged side by side is defined for each of the plurality of frame portions 6. Thus, in the following description, the predetermined direction will also be hereinafter referred to as a "predetermined direction associated with the frame portion 6." Also, in FIG. 2, the frame portion 6 located on the positive side of the Y-axis direction as viewed from the weight 4 will be hereinafter referred to as a "frame portion 6A." The frame portion 6 located on the negative side of the X-axis direction as viewed from the weight 4 will be hereinafter referred to as a "frame portion 6B." The frame portion 6 located on the negative side of the Y-axis direction as viewed from the weight 4 will be hereinafter referred to as a "frame portion 6C." The frame portion 6 located on the positive side of the X-axis direction as viewed from the weight 4 will be hereinafter referred to as a "frame portion 6D." In this case, the predetermined direction associated with the frame portion 6A, and the predetermined direction associated with the frame portion 6B are different from each other, for example.

Each of the four frame portions 6 has a rectangular frame shape and includes four frame pieces 61-64. Out of these four frame pieces 61-64, the two frame pieces 61,62, of which the longitudinal axis is perpendicular to the predetermined direction in which the frame portions 6 and the weight 4 are arranged side by side, are longer than the two other frame pieces 63,64, of which the longitudinal axis is aligned with the predetermined direction. In other words, in each of the four frame portions 6, its length as measured perpendicularly to the predetermined direction is greater than its length as measured in the predetermined direction. Also, in each of the four frame portions 6, the length as measured along the longitudinal axis of the frame piece 61 is greater than the length of one side, facing the frame portion 6, of the weight 4 (i.e., one side of the square weight 4).

In the sensor element 100, the weight 4 and each of the four frame portions 6 are connected to each other via their associated two first elastic portions 51. The two first elastic portions 51 are connected at one end thereof to their associated two corners of the weight 4 and are connected at the other end thereof to the frame piece 61 that is located closer to the weight 4 than any other one of the four frame pieces 61-64 of the frame portion 6.

Each pair of first elastic portions 51 connects the weight 4 to an associated one of the frame portions 6 and is elastically deformable in a direction that is perpendicular to not only the thickness direction D1 defined for the first substrate 1 but also the predetermined direction associated with the frame portion 6. For example, the pair of first elastic portions 51 connected to the frame portion 6A are configured to be elastically deformable more easily in the X-axis direction than in the Y- and Z-axis directions. The pair of first elastic portions 51 connected to the frame portion 6B are configured to be elastically deformable more easily in the Y-axis direction than in the X- and Z-axis directions. The pair of first elastic portions 51 connected to the frame portion 6C are configured to be elastically deformable more easily in the X-axis direction than in the Y- and Z-axis directions. The pair of first elastic portions 51 connected to the frame portion 6D are configured to be elastically deformable more easily in the Y-axis direction than in the X- and Z-axis directions. Each of the first elastic portions 51 configured to be elastically deformable more easily in the X-axis direction has lower rigidity in the X-axis direction than in the Y- or Z-axis direction. Each of the first elastic portions 51 configured to be elastically deformable more easily in the Y-axis direction has lower rigidity in the Y-axis direction than in the X- or Z-axis direction.

Each of the plurality of first elastic portions 51 is a spring. Each of the plurality of first elastic portions 51 has a winding shape when viewed in plan in the thickness direction D1 defined for the first substrate 1.

The four frame portions 6 are arranged, along with the four supporting portions 7, to surround the weight 4. In the sensor element 100, when viewed in plan in the thickness direction D1 defined for the first substrate 1, the four frame portions 6 and the four supporting portions 7 are alternately arranged one by one along the outer peripheral edges of the weight 4.

Each of the four frame portions 6 is supported, via the second elastic portion 52, by each of the two supporting portions 7 adjacent to the frame portion 6. In the sensor element 100, each of the four frame portions 6 is connected to associated two of the second elastic portions 52 at one end thereof. In this case, the respective other ends of the two second elastic portions 52 are connected to mutually different supporting portions 7. The plurality of second elastic portions 52 are not fixed to the first substrate 1 but are out of contact with the first principal surface 11 of the first substrate 1. Each of the plurality of second elastic portions 52 is elastically deformable in the predetermined direction associated with the frame portion 6 connected to the second elastic portion 52. Specifically, the two second elastic portions 52 connected to the frame portion 6A are configured to be elastically deformable more easily in the Y-axis direction than in the X- or Z-axis direction. The two second elastic portions 52 connected to the frame portion 6B are configured to be elastically deformable more easily in the X-axis direction than in the Y- or Z-axis direction. The two second elastic portions 52 connected to the frame portion 6C are configured to be elastically deformable more easily in the Y-axis direction than in the X- or Z-axis direction. The two second elastic portions 52 connected to the frame portion 6D are configured to be elastically deformable more easily in the X-axis direction than in the Y- or Z-axis direction. Each of the second elastic portions 52 configured to be elastically deformable more easily in the Y-axis direction has lower rigidity in the Y-axis direction than in the X- or Z-axis direction. Each of the second elastic portions 52 configured to be deformable more easily in the X-axis direction has lower rigidity in the X-axis direction than in the Y- or Z-axis direction. Each of the plurality of second elastic portions 52 is flexible (elastically deformable). In this case, each of the plurality of second elastic portions 52 has a second folded portion 523 when viewed in plan in the thickness direction D1 defined for the first substrate 1. The second folded portion 523 has a U-shape when viewed in plan in the thickness direction D1 defined for the first substrate 1. Each of the plurality of second elastic portions 52 has a single second folded portion 523.

The frame portion 6A is displaceable in not only the predetermined direction associated with the frame portion 6A but also a direction perpendicular to the predetermined direction associated with the frame portion 6A and the thickness direction D1 defined for the first substrate 1. The frame portion 6B is displaceable in not only the predetermined direction associated with the frame portion 6B but also a direction perpendicular to the predetermined direction associated with the frame portion 6B and the thickness direction D1 defined for the first substrate 1. The frame portion 6C is displaceable in not only the predetermined direction associated with the frame portion 6C but also a direction perpendicular to the predetermined direction associated with the frame portion 6C and the thickness direction D1 defined for the first substrate 1. The frame portion 6D is displaceable in not only the predetermined direction associated with the frame portion 6D but also a direction perpendicular to the predetermined direction associated with the frame portion 6D and the thickness direction D1 defined for the first substrate 1.

In the following description, as for the four first driving electrodes 81, the first driving electrode 81 associated with the frame portion 6A will be hereinafter referred to as a "first driving electrode 81A," the first driving electrode 81 associated with the frame portion 6B will be hereinafter referred to as a "first driving electrode 81B," the first driving electrode 81 associated with the frame portion 6C will be hereinafter referred to as a "first driving electrode 81C," and the first driving electrode 81 associated with the frame portion 6D will be hereinafter referred to as a "first driving electrode 81D" for the sake of convenience of description. As for the four second driving electrodes 82, the second driving electrode 82 associated with the frame portion 6A will be hereinafter referred to as a "second driving electrode 82A," the second driving electrode 82 associated with the frame portion 6B will be hereinafter referred to as a "second driving electrode 82B," the second driving electrode 82 associated with the frame portion 6C will be hereinafter referred to as a "second driving electrode 82C," and the second driving electrode 82 associated with the frame portion 6D will be hereinafter referred to as a "second driving electrode 82D" for the sake of convenience of description. The four first driving electrodes 81A, 81B, 81C, and 81D are fixed to the first substrate 1. The four second driving electrodes 82A, 82B, 82C, and 82D are out of contact with the first substrate 1.

The first driving electrode 81A is located between, and out of contact with, the frame portion 6A and the weight 4. The first driving electrode 81B is located between, and out of contact with, the frame portion 6B and the weight 4. The first driving electrode 81C is located between, and out of contact with, the frame portion 6C and the weight 4. The first driving electrode 81D is located between, and out of contact with, the frame portion 6D and the weight 4.

The second driving electrode 82A includes electrode portions (second comb teeth 822) which are provided outside of, and connected to, the frame portion 6A, and faces the first driving electrode 81A. The second driving electrode 82A is displaceable in the predetermined direction associated with the frame portion 6A. The second driving electrode 82B includes electrode portions (second comb teeth 822) which are provided outside of, and connected to, the frame portion 6B, and faces the first driving electrode 81B. The second driving electrode 82B is displaceable in the predetermined direction associated with the frame portion 6B. The second driving electrode 82C includes electrode portions (second comb teeth 822) which are provided outside of, and connected to, the frame portion 6C, and faces the first driving electrode 81C. The second driving electrode 82C is displaceable in the predetermined direction associated with the frame portion 6C. The second driving electrode 82D includes electrode portions (second comb teeth 822) which are provided outside of, and connected to, the frame portion 6D, and faces the first driving electrode 81D. The second driving electrode 82D is displaceable in the predetermined direction associated with the frame portion 6D. The second comb teeth 822 connected to the frame portion 6A are displaceable in the Y-axis direction. The second comb teeth 822 connected to the frame portion 6B are displaceable in the X-axis direction. The second comb teeth 822 connected to the frame portion 6C are displaceable in the Y-axis direction. The second comb teeth 822 connected to the frame portion 6D are displaceable in the X-axis direction.

Each of the plurality of first driving electrodes 81A, 81B, 81C, and 81D is a comb electrode. When viewed in plan in the thickness direction D1 defined for the first substrate 1, each of the plurality of first driving electrodes 81A, 81B, 81C, and 81D includes a first comb bone 811 facing its associated frame portion 6A, 6B, 6C, or 6D and a plurality of first comb teeth 812 protruding from the first comb bone 811 toward its associated frame portion 6.

Each of the plurality of second driving electrodes 82A, 82B, 82C, and 82D is a comb electrode. When viewed in plan in the thickness direction D1 defined for the first substrate 1, each of the plurality of second driving electrodes 82A, 82B, 82C, and 82D includes a second comb bone 821 constituted by a part, facing the first comb bone 811, of the frame portion 6A, 6B, 6C, or 6D (i.e., a part of the frame piece 61) and a plurality of second comb teeth 822 (electrode portions) protruding from the second comb bone 821 toward the first comb bone 811.

In the sensor element 100, when viewed in plan in the thickness direction D1 defined for the first substrate 1, the plurality of first comb teeth 812 of the first driving electrode 81A and the plurality of second comb teeth 822 of the second driving electrode 82A are alternately arranged one by one and out of contact with each other in the direction perpendicular to the direction in which the first comb bone 811 and the second comb bone 821 face each other. In addition, in the sensor element 100, when viewed in plan in the thickness direction D1 defined for the first substrate 1, the plurality of first comb teeth 812 of the first driving electrode 81B and the plurality of second comb teeth 822 of the second driving electrode 82B are alternately arranged one by one and out of contact with each other in the direction perpendicular to the direction in which the first comb bone 811 and the second comb bone 821 face each other. Furthermore, in the sensor element 100, when viewed in plan in the thickness direction D1 defined for the first substrate 1, the plurality of first comb teeth 812 of the first driving electrode 81C and the plurality of second comb teeth 822 of the second driving electrode 82C are alternately arranged one by one and out of contact with each other in the direction perpendicular to the direction in which the first comb bone 811 and the second comb bone 821 face each other. Furthermore, in the sensor element 100, when viewed in plan in the thickness direction D1 defined for the first substrate 1, the plurality of first comb teeth 812 of the first driving electrode 81D and the plurality of second comb teeth 822 of the second driving electrode 82D are alternately arranged one by one and out of contact with each other in the direction perpendicular to the direction in which the first comb bone 811 and the second comb bone 821 face each other.

The plurality of first detection electrodes 91A, 91B, 91C, and 91D are located inside the frame portions 6A, 6B, 6C, and 6D, respectively. The plurality of first detection electrodes 91A, 91B, 91C, and 91D are fixed to the first substrate 1.

Each of the plurality of second detection electrodes 92A, 92B, 92C, and 92D includes electrode portions (second comb teeth 922), which are located inside, and connected to, its associated frame portion 6A, 6B, 6C, or 6D, and faces its associated first detection electrode 91A, 91B, 91C, or 91D. Each of the plurality of second detection electrodes 92A, 92B, 92C, and 92D is displaceable in the predetermined direction associated with the frame portion 6A, 6B, 6C, or 6D. For example, the electrode portions (second comb teeth 922) connected to the frame portion 6A are displaceable in the Y-axis direction. The electrode portions (second comb teeth 922) connected to the frame portion 6B are displaceable in the X-axis direction. The second comb teeth 922 connected to the frame portion 6C are displaceable in the Y-axis direction. The second comb teeth 922 connected to the frame portion 6D are displaceable in the X-axis direction.

When viewed in plan in the thickness direction D1 defined for the first substrate 1, each of the first detection electrodes 91A, 91B, 91C, and 91D has a comb shape. Also, when viewed in plan in the thickness direction D1 defined for the first substrate 1, each of the first detection electrodes 91A, 91B, 91C, and 91D includes: a first comb bone 911 arranged to be aligned with the direction in which the weight 4 and the frame portion 6A, 6B, 6C, or 6D are arranged side by side; and a plurality of (e.g., six in the example illustrated in FIG. 2) first comb teeth 912 protruding from the first comb bone 911 toward portions (frame pieces 63, 64), facing the first comb bone 911, of the frame portion 6A, 6B, 6C, or 6D. The six first comb teeth 912 include three first comb teeth 912 protruding toward one frame piece 63 out of the four frame pieces 61-64 of the frame portion 6 and three first comb teeth 912 protruding toward another frame piece 64 out of the four frame pieces 61-64 of the frame portion 6.

Each of the second detection electrodes 92A, 92B, 92C, and 92D includes: a base portion 921 constituted by its associated frame portion 6A, 6B, 6C, or 6D; and a plurality of plurality of (e.g., four in the example illustrated in FIG. 2) second comb teeth 922 protruding from the base portion 921 toward the first comb bone 911 of its associated first detection electrode 91A, 91B, 91C, or 91D. That is to say, in the sensor element 100, the plurality of frame portions 6A, 6B, 6C, and 6D also serve as respective parts (base portions 921) of the second detection electrodes 92A, 92B, 92C, and 92D. In each of the plurality of second detection electrodes 92A, 92B, 92C, and 92D, two second comb teeth 922 protrude from each of the two frame pieces 63, 64 of the associated frame portion 6A, 6B, 6C, or 6D toward the first comb bone 911. In addition, in each of the plurality of second detection electrodes 92A, 92B, 92C, and 92D, each of the two frame pieces 61, 62 also serves as a second comb tooth protruding from both of the two frame pieces 63, 64.

In the sensor element 100, when viewed in plan in the thickness direction D1 defined for the first substrate 1, the plurality of first comb teeth 912 of the first detection electrode 91A and the plurality of second comb teeth 922 of the second detection electrode 92A are alternately arranged one by one and out of contact with each other in the direction perpendicular to the direction in which the first comb teeth 912 protrude from the first comb bone 911 of the first detection electrode 91A. In the second detection electrode 92A, each of the two frame pieces 61, 62 also serves as a second comb tooth protruding from both of the two frame pieces 63, 64. In the sensor element 100, the first detection electrodes 91B, 91C, and 91D and the second detection electrodes 92B, 92C, and 92D have the same shape as the first detection electrode 91A and the second detection electrode 92A, respectively. In the sensor element 100, when viewed in plan in the thickness direction D1 defined for the first substrate 1, the plurality of first comb teeth 912 of the first detection electrode 91B and the plurality of second comb teeth 922 of the second detection electrode 92B are alternately arranged one by one and out of contact with each other. In the sensor element 100, when viewed in plan in the thickness direction D1 defined for the first substrate 1, the plurality of first comb teeth 912 of the first detection electrode 91C and the plurality of second comb teeth 922 of the second detection electrode 92C are alternately arranged one by one and out of contact with each other. In the sensor element 100, when viewed in plan in the thickness direction D1 defined for the first substrate 1, the plurality of first comb teeth 912 of the first detection electrode 91D and the plurality of second comb teeth 922 of the second detection electrode 92D are alternately arranged one by one and out of contact with each other.

In the sensor element 100, all constituent elements but the second substrate 2 and the respective bonding portions 26, 27, 28, and 29 are formed by patterning a silicon on insulator (SOI) wafer by micro-electro-mechanical systems (MEMS) manufacturing technology. The SOI wafer includes a silicon wafer, an insulating layer (such as a buried oxide film) formed on the silicon wafer, and a silicon layer formed on the insulating layer. In the sensor element 100, the first substrate 1 (first silicon substrate) is formed out of part of the silicon wafer of the SOI wafer and the weight 4, the eight first elastic portions 51, the eight second elastic portions 52, the four frame portions 6, the four second driving electrodes 82, the four second detection electrodes 92, the four supporting portions 7, the four first driving electrodes 81, and the four first detection electrodes 91 are formed out of respective parts of the silicon layer. The silicon layer includes a dopant and the weight 4, the eight first elastic portions 51, the eight second elastic portions 52, the four frame portions 6, the four second driving electrodes 82, the four second detection electrodes 92, the four supporting portions 7, the four first driving electrodes 81, and the four first detection electrodes 91 have electrical conductivity. In the sensor element 100, an insulating portion 13 is interposed between the plurality of constituent elements (including the supporting portions 7, the four first driving electrodes 81, and the four first detection electrodes 91) fixed to the first substrate 1 and the first principal surface 11 of the first substrate 1. In addition, in the sensor element 100, there is a space 14 between the plurality of constituent elements (such as the weight 4, the eight first elastic portions 51, the eight second elastic portions 52, the four frame portions 6, the four second driving electrodes 82, and the four second detection electrodes 92) which are not fixed to the first substrate 1 and the first substrate 1. Each insulating portion 13 forms part of the insulating layer of the SOI wafer. That is to say, the material for each insulating portion 13 is silicon oxide. The plurality of constituent elements fixed to the first substrate 1 are fixed to the first substrate 1 via the insulating portion 13.

In the sensor element 100, the internal space of a package formed by the first substrate 1, the spacer portion 15, and the second substrate 2 may be, for example, a nitrogen gas atmosphere or a reduced pressure atmosphere (vacuum).

(2.2) IC Chip

The IC chip 200 (see FIGS. 1 and 6) is an application specific integrated circuit (ASIC) chip. The IC chip 200 is an Si-based IC chip. When viewed in plan in the thickness direction defined for the IC chip 200, the IC chip 200 may be, but does not have to be, square and may also be rectangular, for example. In other words, when viewed in plan in the thickness direction defined for the IC chip 200, the outer peripheral edges 207 of the IC chip 200 form a square. The IC chip 200 has a first principal surface 201 and a second principal surface 202. The first principal surface 201 and the second principal surface 202 intersect with the thickness direction defined for the IC chip 200.

The IC chip 200 includes a silicon substrate 203, a multilayer structure part 205, and a plurality of external connection terminals (pad electrodes). The silicon substrate 203 has a first surface 231 and a second surface 232 opposite from the first surface 231. The IC chip 200 includes, as a plurality of functional sections, a signal processor 211, a driving controller 212, a first voltage generator 221, and a second voltage generator 222 (see FIG. 6). In each of the plurality of functional sections (namely, the signal processor 211, the driving controller 212, the first voltage generator 221, and the second voltage generator 222), part of the functional section is formed in the silicon substrate 203 and the rest of the functional section is included in the multilayer structure part 205. The IC chip 200 includes a control unit 210 including the signal processor 211, the driving controller 212, and a memory (see FIG. 6). The multilayer structure part 205 is formed on the first surface 231 of the silicon substrate 203. The multilayer structure part 205 includes an interconnection layer and a passivation film. The plurality of external connection terminals are electrically connected to at least one of the plurality of functional sections. The plurality of external connection terminals includes a first external connection terminal T21, a second external connection terminal T22, a third external connection terminal T23, a fourth external connection terminal T24, a fifth external connection terminal T25, and a sixth external connection terminal T26. The first external connection terminal T21 is connected to an output terminal of the second voltage generator 222. The second external connection terminal T22 is connected to an input terminal of the signal processor 211. The third external connection terminal T23 is connected to an output terminal of the driving controller 212. The fourth external connection terminal T24 is connected to an input terminal of the first voltage generator 221. The fifth external connection terminal T25 is connected to the signal processor 211 and driving controller 212 of the control unit 210. The fifth external connection terminal T25 is an external connection terminal, to which a ground potential is applied, out of the plurality of external connection terminals of the IC chip 200. In other words, the fifth external connection terminal T25 is a ground electrode of the IC chip 200. The sixth external connection terminal T26 is an external connection terminal connected to a path between the first voltage generator 221 and the control unit 210. In other words, the sixth external connection terminal T26 is an operating voltage electrode of the IC chip 200. As used herein, the "operating voltage electrode of the IC chip 200" refers to an electrode, of which the potential is as high as the operating voltage of the IC chip 200, in the IC chip 200. More specifically, the sixth external connection terminal T26 is an external connection terminal to which a first voltage that is the operating voltage (of 1 V, for example) of the signal processor 211 is applied.

The first principal surface 201 of the IC chip 200 includes the other surface, opposite from the surface in contact with the silicon substrate 203, of the multilayer structure part 205, and respective surfaces of the plurality of external connection terminals. The second principal surface 202 of the IC chip 200 includes the second surface 232 of the silicon substrate 203.

In the IC chip 200, the first principal surface 201 of the IC chip 200 faces the second principal surface 12 of the first substrate 1 of the sensor element 100. When viewed in plan in the thickness direction D1 defined for the first substrate 1, the IC chip 200 may be, but does not have to be, square and may also be rectangular, for example. When viewed in plan in the thickness direction D1 defined for the first substrate 1, the IC chip 200 has larger external dimensions than the sensor element 100. When viewed in plan in the thickness direction D1 defined for the first substrate 1, the outer peripheral edges 207 of the IC chip 200 are located outside of the outer peripheral edges 107 of the sensor element 100. In other words, when viewed in plan in the direction in which the first principal surface 201 and second principal surface 202 of the IC chip 200 are arranged, the outer peripheral edges 207 of the IC chip 200 are located outside of the outer peripheral edges 107 of the sensor element 100.

Figure 6:
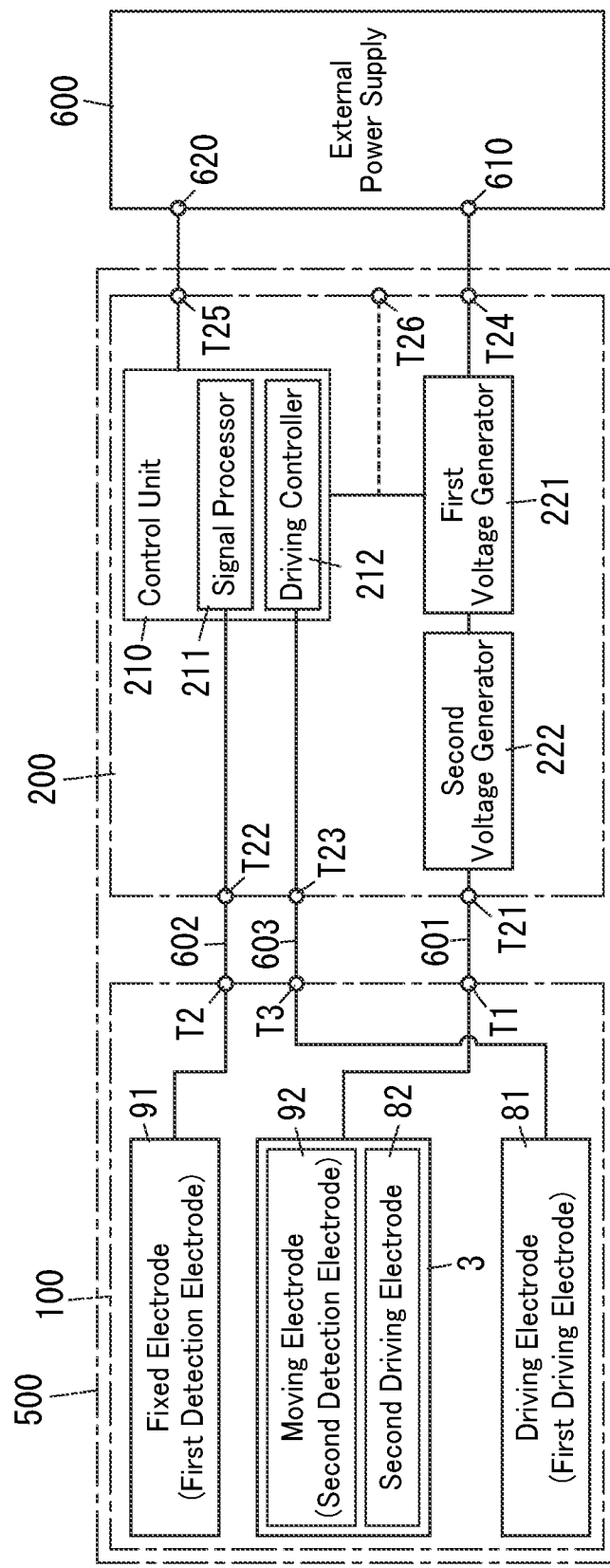
FIG. 6 is a circuit block diagram of the sensor device.

As shown in FIG. 6, the signal processor 211 is connected to the second terminal T2 of the sensor element 100 via the second external connection terminal T22 and the second connection member 602. Thus, the signal processor 211 is connected to the first detection electrode 91 (fixed electrode 91) via the second external connection terminal T22, the second connection member 602, and the second terminal T2. The signal processor 211 processes a detection signal supplied from the second terminal T2 of the sensor element 100. More specifically, the signal processor 211 converts an analog detection signal (electrical signal) supplied from the sensor element 100 into a digital signal and performs appropriate computational processing on the digital signal, thereby obtaining an angular velocity around the Z-axis.

The driving controller 212 is connected to the third terminal T3 of the sensor element 100 via the third external connection terminal T23 and the third connection member 603. Thus, the driving controller 212 is connected to the first driving electrode 81 via the third external connection terminal T23, the third connection member 603, and the third terminal T3.

The first voltage generator 221 generates a first voltage as the operating voltage (of 1 V, for example) for the signal processor 211. The first voltage generator 221 may be, for example, a voltage step-down circuit for generating the first voltage (of 1 V, for example) by subjecting a DC voltage (of 5 V or 3.3 V, for example) supplied from an external power supply 600 to DC-DC conversion. In the IC chip 200, an output terminal 610 with the higher potential, out of a pair of output terminals 610, 620 of the external power supply 600, is connected to the fourth external connection terminal T24 and the output terminal 620 with the lower potential (i.e., a ground potential), out of the pair of output terminals 610, 620 of the external power supply 600, is connected to the fifth external connection terminal T25. In the IC chip 200, the fourth external connection terminal T24 is connected to the first voltage generator 221. Also, in the IC chip 200, the fifth external connection terminal T25 is connected to the signal processor 211 and the driving controller 212.

The second voltage generator 222 generates a second voltage corresponding to the sensor element's 100 reference potential (of 20 V, for example) to be applied to the first terminal T1 of the sensor element 100. In the sensor device 500, the reference potential of the sensor element 100 may be, for example, the potential at the moving part 3, more specifically, the potential at the second detection electrode (moving electrode 92) and second driving electrode 82 included in the moving part 3. The second voltage generated by the second voltage generator 222 is larger than the first voltage. Thus, the second voltage generator 222 is a voltage step-up circuit for boosting the first voltage to the second voltage. The second voltage generator 222 may include, for example, a charge pump circuit for generating the second voltage by boosting the first voltage supplied from the first voltage generator 221. The charge pump circuit includes, for example, a plurality of capacitors and a plurality of switches (such as MOSFETs). The circuit configuration of the charge pump circuit is not limited to any particular one.

(2.3) Resin-Based Adhesive Layer

The resin-based adhesive layer 300 is interposed between the sensor element 100 and the conductive layer 400 as shown in FIG. 1. The resin-based adhesive layer 300 is in contact with the second principal surface 12 of the first substrate 1 of the sensor element 100. In addition, the resin-based adhesive layer 300 is also in contact with the principal surface 401, facing the sensor element 100, of the conductive layer 400. A material for the resin-based adhesive layer 300 may be, for example, a silicone-based resin. The material for the resin-based adhesive layer 300 does not have to be a silicone-based resin but may also be an epoxy-based resin, for example.

When viewed in plan in the thickness direction D1 defined for the first substrate 1, the resin-based adhesive layer 300 is overlapped by the sensor element 100 in its entirety. In FIG. 1, the resin-based adhesive layer 300 is in contact with the entire second principal surface 12 of the first substrate 1. However, the resin-based adhesive layer 300 does not have to be in contact with the entire second principal surface 12. Alternatively, in the sensor device 500, a very small void may be left between the resin-based adhesive layer 300 and a part of the second principal surface 12 of the first substrate 1.

In addition, when viewed in plan in the thickness direction D1 defined for the first substrate 1, the resin-based adhesive layer 300 overlaps with a part of the conductive layer 400. In FIG. 1, the resin-based adhesive layer 300 is in contact with almost entire principal surface 401 of the conductive layer 400. Alternatively, in the sensor device 500, a very small void may be left between the resin-based adhesive layer 300 and the part of the principal surface 401 of the conductive layer 400.

When viewed in plan in the thickness direction D1 defined for the first substrate 1, part of the conductive layer 400 overlaps with a part of the first external connection terminal T21 among the plurality of external connection terminals of the IC chip 200. That part of the conductive layer 400 is in contact with a part of the surface of the first external connection terminal T21. This makes the conductive layer 400 electrically connected to the first external connection terminal T21 among the plurality of external connection terminals of the IC chip 200. Thus, the conductive layer 400 is electrically connected to the first terminal T1 of the sensor element 100 via the first external connection terminal T21 and the first connection member 601. The conductive layer 400 is not electrically connected to any of the second external connection terminal T22, the third external connection terminal T23, the fourth external connection terminal T24, or the fifth external connection terminal T25 among the plurality of external connection terminals of the IC chip 200.

(2.4) Connection Members

As described above, the sensor device 500 includes a plurality of connection members that electrically connect the sensor element 100 and the IC chip 200 together. The plurality of connection members includes the first connection member 601 (see FIGS. 1 and 6), the second connection member 602 (see FIGS. 1 and 6), and the third connection member 603 (see FIG. 6). The first connection member 601 connects the first external connection terminal T21 of the IC chip 200 and the first terminal T1 of the sensor element 100 together. The second connection member 602 connects the second external connection terminal T22 of the IC chip 200 and the second terminal T2 of the sensor element 100 together. The third connection member 603 connects the third external connection terminal T23 of the IC chip 200 and the third terminal T3 of the sensor element 100 together. Each of the first connection member 601, the second connection member 602, and the third connection member 603 is an electrically conductive wire (bonding wire). A material for the conductive wire may be, for example, gold, an aluminum alloy, or copper.

The sensor device 500 according to this embodiment includes multiple sets, each of which includes the third terminal T3, the third connection member 603, the third external connection terminal T23, and the driving controller 212 as shown in FIG. 6, such that each of the plurality of driving electrodes 81 is provided one to one with an associated one of these multiple sets. In other words, in the sensor device 500, each driving electrode 81 is provided with the third terminal T3, the third connection member 603, the third external connection terminal T23, and the driving controller 212. In addition, the sensor device 500 according to the first embodiment further includes multiple sets, each of which includes the second terminal T2, the second connection member 602, and the second external connection terminal T22 as shown in FIG. 6, such that each of the plurality of fixed electrodes 91 is provided one to one with an associated one of these multiple sets. In other words, in the sensor device 500, each fixed electrode 91 is provided with the second terminal T2, the second connection member 602, and the second external connection terminal T22.

(2.5) Conductive Layer

When viewed in plan in the thickness direction D1 defined for the first substrate 1, the conductive layer 400 (see FIG. 1) has a square shape. However, the conductive layer 400 does not have to be square but may also be rectangular, for example, in the plan view. When viewed in plan in the thickness direction D1 defined for the first substrate 1, the conductive layer 400 has larger external dimensions than the sensor element 100. When viewed in plan in the thickness direction D1 defined for the first substrate 1, the outer peripheral edges 407 of the conductive layer 400 are located outside of the outer peripheral edges 107 of the sensor element 100. Also, when viewed in plan in the thickness direction D1 defined for the first substrate 1, the conductive layer 400 has smaller external dimensions than the IC chip 200. When viewed in plan in the thickness direction D1 defined for the first substrate 1, the outer peripheral edges 407 of the conductive layer 400 are located inside of the outer peripheral edges 207 of the IC chip 200.

The conductive layer 400 has electrical conductivity. The conductive layer 400 may have a multilayer structure in which a plurality of metal layers are stacked one on top of another. Alternatively, the conductive layer 400 may also be a single metal layer. The metal layer includes either a single type of metal or multiple types of metals. If the conductive layer 400 has a multilayer structure in which a plurality of metal layers are stacked one on top of another, the conductive layer 400 may include, for example, a first metal layer on the first principal surface 201 of the IC chip 200 and a second metal layer on the first metal layer. A material for the first metal layer may be a material that adheres more closely to the passivation film of the IC chip 200 than a material for the second metal layer does. If the material for the second metal layer is Au, then the material for the first metal layer may be Ti, for example. On the other hand, if the conductive layer 400 is a single metal layer, then the conductive layer 400 may be an Au layer, for example.

(3) Operation of Sensor Device

The sensor device 500 according to the first embodiment detects, by using Coriolis force (deflecting force) acting on the weight 4, an angular velocity around the Z-axis with the weight 4 caused to vibrate in the X-axis direction, for example.

Specifically, when a drive signal is supplied from the driving controller 212 (see FIG. 6) to the first driving electrodes 81B, 81D shown in FIG. 2, for example, a voltage signal for driving is applied to between the first driving electrode 81B and the second driving electrode 82B and between the first driving electrode 81D and the second driving electrode 82D. This causes electrostatic force between the first driving electrode 81B and the second driving electrode 82B and between the first driving electrode 81D and the second driving electrode 82D in the sensor device 500, thus causing the weight 4 to vibrate in the X-axis direction.

Suppose a situation where an angular velocity around the Z-axis acts on the weight 4 of the sensor element 100 with the weight 4 vibrating in the X-axis direction. In that case, Coriolis force (deflecting force) acts on the weight 4, thus producing vibrations in the Y-axis direction in the weight 4 and causing the frame portions 6A, 6C to vibrate in the Y-axis direction.

In the sensor device 500, as the two frame portions 6A, 6C arranged side by side in the Y-axis direction vibrate in the Y-axis direction, the length of the gap between the first detection electrode 91A and the second detection electrode 92A associated with the frame portion 6A and the length of the gap between the first detection electrode 91C and the second detection electrode 92C associated with the frame portion 6C vary. This variation in gap length is output as a variation in electrostatic capacitance to the signal processor 211 (see FIG. 6). Thus, in the sensor device 500, an electrical signal representing the angular velocity around the Z-axis applied to (the weight 4 of) the sensor element 100 is output from the second terminal T2 to the signal processor 211. Note that the first detection electrode 91B and the second detection electrode 92B may be used to monitor the displacement of the weight 4 in the X-axis direction. Likewise, the first detection electrode 91D and the second detection electrode 92D may also be used to monitor the displacement of the weight 4 in the X-axis direction.

In the sensor device 500, the signal processor 211 converts an analog electrical signal (analog signal) supplied from the sensor element 100 into a digital signal and performs appropriate computational processing on the digital signal, thereby obtaining the angular velocity around the Z-axis.

(4) Advantages

The sensor device 500 according to the first embodiment includes the conductive layer 400 interposed between the first principal surface 201 of the IC chip 200 and the sensor element 100 and facing the sensor element 100 via the resin-based adhesive layer 300. The conductive layer 400 is electrically connected to the first terminal T1 that is connected to the moving electrode 92. This allows the sensor device 500 according to the first embodiment to reduce a variation in the capacitance value of a coupled capacitor between the sensor element 100 and the IC chip 200 due to a variation with time in the material properties of the resin-based adhesive layer 300, thus enabling reducing a variation in the sensor characteristics of the sensor element 100. Thus, the sensor device 500 according to the first embodiment may contribute to improving the reliability.

In addition, in the sensor device 500 according to the first embodiment, when viewed in plan in the direction in which the first principal surface 201 and second principal surface 202 of the IC chip 200 are arranged (in other words, when viewed in the thickness direction defined for the IC chip 200), the outer peripheral edges 407 of the conductive layer 400 are located outside of the outer peripheral edges 107 of the sensor element 100. This allows the sensor device 500 to reduce the capacitance coupling between the sensor element 100 and the IC chip 200.

Second Embodiment

Figure 7:
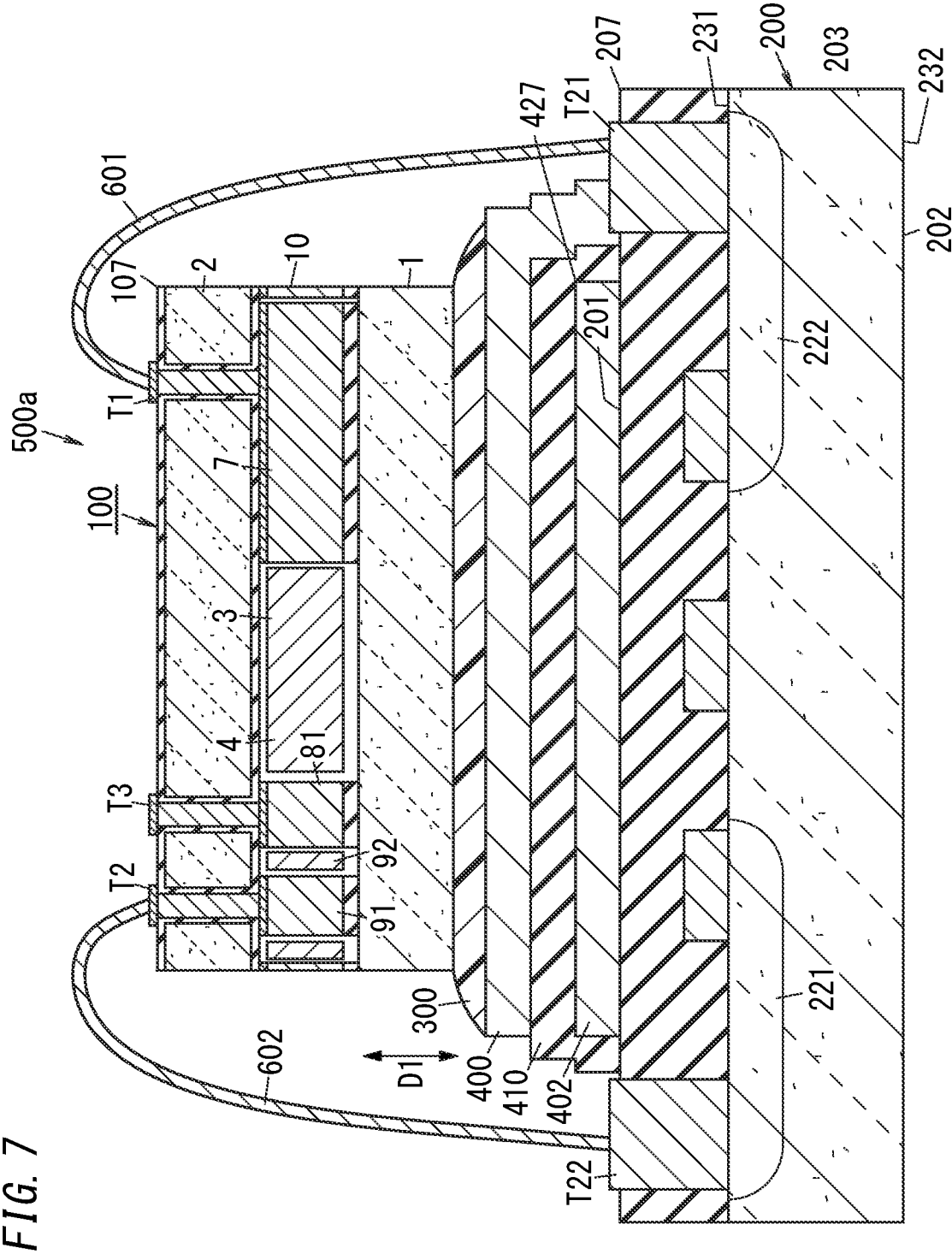
FIG. 7 is a cross-sectional view of a sensor device according to a second embodiment.

Next, a sensor device 500a according to a second embodiment will be described with reference to FIG. 7. The sensor device 500a according to the second embodiment further includes: an insulating layer 410; and a second conductive layer 402 different from the conductive layer 400 (hereinafter referred to as a "first conductive layer 400"), which is a major difference from the sensor device 500 according to the first embodiment described above. In the following description, any constituent element of the sensor device 500a according to this second embodiment, having the same function as a counterpart of the sensor device 500 according to the first embodiment described above, will be designated by the same reference numeral as that counterpart's, and description thereof will be omitted herein.

The insulating layer 410 is interposed between the first conductive layer 400 and the first principal surface 201 of the IC chip 200. A material for the insulating layer 410 may be silicon nitride, for example. The material for the insulating layer 410 does not have to be silicon nitride but may also be silicon oxide, for example.

The second conductive layer 402 is interposed between the insulating layer 410 and the first principal surface 201 of the IC chip 200 and faces the first conductive layer 400 via the insulating layer 410.

The second conductive layer 402 is electrically connected to either the fifth external connection terminal T25 (see FIG. 6), which is the ground electrode of the IC chip 200, or the sixth external connection terminal T26 (see FIG. 6), which is an operating voltage electrode of the IC chip 200.

When viewed in plan in the thickness direction D1 defined for the first substrate 1, the second conductive layer 402 has a square shape. However, the second conductive layer 402 does not have to be square but may also be rectangular, for example, in the plan view. When viewed in plan in the thickness direction D1 defined for the first substrate 1, the second conductive layer 402 has larger external dimensions than the sensor element 100. When viewed in plan in the thickness direction D1 defined for the first substrate 1, the outer peripheral edges 427 of the second conductive layer 402 are located outside of the outer peripheral edges 107 of the sensor element 100. Also, when viewed in plan in the thickness direction D1 defined for the first substrate 1, the second conductive layer 402 has smaller external dimensions than the IC chip 200. When viewed in plan in the thickness direction D1 defined for the first substrate 1, the outer peripheral edges 427 of the second conductive layer 402 are located inside of the outer peripheral edges 207 of the IC chip 200.

The second conductive layer 402 has electrical conductivity. The second conductive layer 402 may have a multilayer structure in which a plurality of metal layers are stacked one on top of another. Alternatively, the second conductive layer 402 may also be a single metal layer. The metal layer includes either a single type of metal or multiple types of metals. If the second conductive layer 402 has a multilayer structure in which a plurality of metal layers are stacked one on top of another, the second conductive layer 402 includes a first metal layer on the first principal surface 201 of the IC chip 200 and a second metal layer on the first metal layer. A material for the first metal layer may be a material that adheres more closely to the passivation film of the IC chip 200 than a material for the second metal layer. If the material for the second metal layer is Au, then the material for the first metal layer may be Ti, for example. Also, if the second conductive layer 402 is a single metal layer, then the second conductive layer 402 may be an Au layer, for example.

The sensor device 500a according to the second embodiment, as well as the sensor device 500 according to the first embodiment, includes the conductive layer 400 interposed between the first principal surface 201 of the IC chip 200 and the sensor element 100 and facing the sensor element 100 via the resin-based adhesive layer 300. The conductive layer 400 is electrically connected to the first terminal T1 that is connected to the moving electrode 92. This allows the sensor device 500a according to the second embodiment to reduce a variation in the capacitance value of a coupled capacitor between the sensor element 100 and the IC chip 200 due to a variation with time in the material properties of the resin-based adhesive layer 300, thus enabling reducing a variation in the sensor characteristics of the sensor element 100.

In addition, the sensor device 500a according to the second embodiment further includes the insulating layer 410 and the second conductive layer 402 and the second conductive layer 402 is electrically connected to either the fifth external connection terminal T25 (see FIG. 6), which is the ground electrode of the IC chip 200, or the sixth external connection terminal T26 (see FIG. 6), which is the operating voltage electrode of the IC chip 200. This allows the sensor device 500a according to the second embodiment to more easily stabilize the potential of the first conductive layer 400 as the conductive layer 400.

Third Embodiment

Next, a sensor device 500b according to a third embodiment will be described with reference to FIGS. 8-11. The sensor device 500b according to the third embodiment includes a sensor element 100b and an IC chip 200b instead of the sensor element 100 and IC chip 200 of the sensor device 500 according to the first embodiment, which is major difference from the sensor device 500 according to the first embodiment. In the following description, any constituent element of the sensor device 500b according to this third embodiment, having the same function as a counterpart of the sensor device 500 according to the first embodiment described above, will be designated by the same reference numeral as that counterpart's, and description thereof will be omitted herein.

Figure 8:
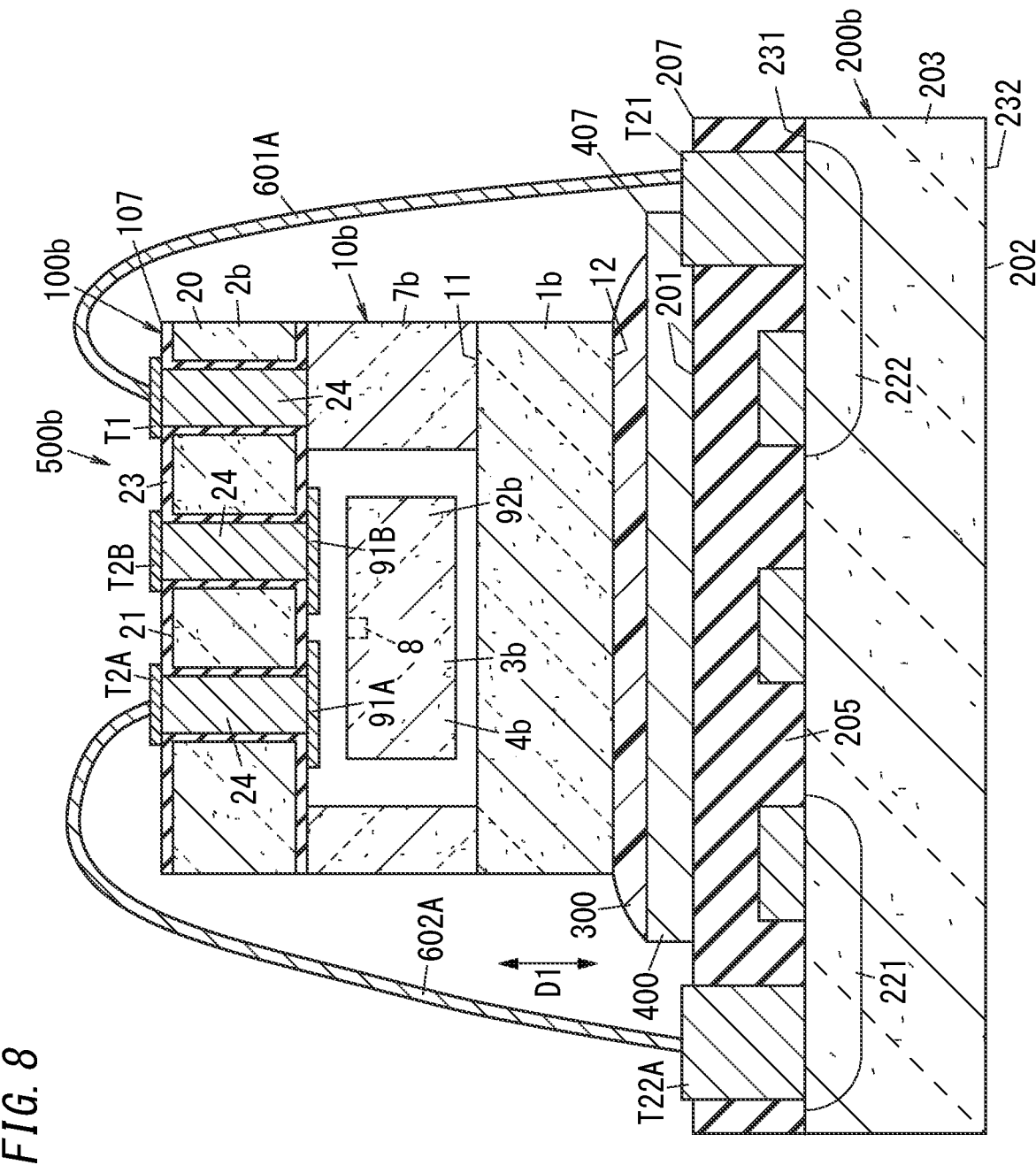
FIG. 8 is a cross-sectional view of a sensor device according to a third embodiment.
Figure 11:
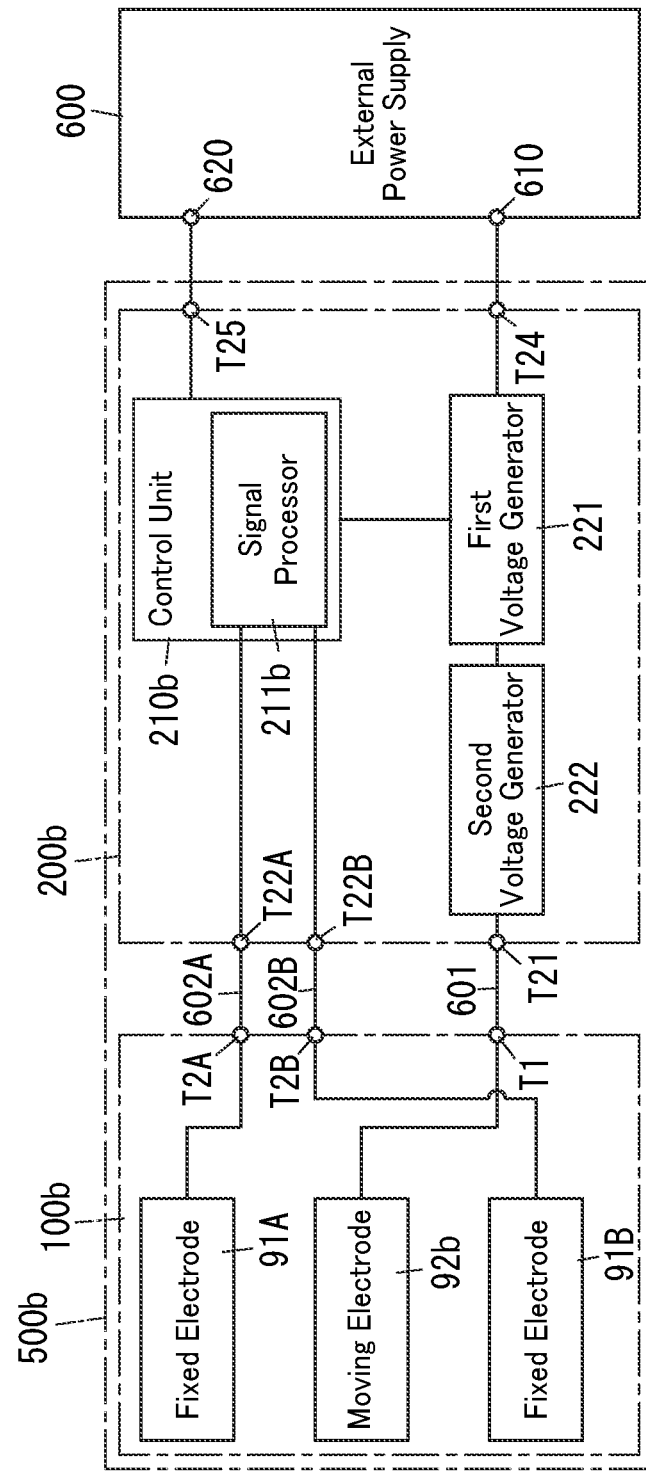
FIG. 11 is a circuit block diagram of the sensor device.

A sensor device 500b according to the third embodiment includes an IC chip 200b, a sensor element 100b, the resin-based adhesive layer 300, and the conductive layer 400 as shown in FIG. 8. The IC chip 200b, as well as the IC chip 200, has the first principal surface 201 and the second principal surface 202. The sensor element 100b is disposed over the first principal surface 201 of the IC chip 200b. The resin-based adhesive layer 300 is interposed between the first principal surface 201 of the IC chip 200b and the sensor element 100b. The conductive layer 400 is interposed between the first principal surface 201 of the IC chip 200b and the sensor element 100b and faces the sensor element 100b via the resin-based adhesive layer 300. The sensor element 100b includes: a moving part 3b including a moving electrode 92b; a fixed part 10b including fixed electrodes 91A, 91B that form electrostatic capacitance between the moving electrode 92b and the fixed electrodes 91A, 91B themselves; a first terminal T1 connected to the moving electrode 92b; and second terminals T2A, T2B connected to the fixed electrodes 91A, 91B, respectively. The IC chip 200b includes: a signal processor 211b that processes detection signals supplied from the second terminal T2A, T2B; a first voltage generator 221 that generates a first voltage as an operating voltage (of 1 V, for example) for the signal processor 211b; and a second voltage generator 222 that generates a second voltage corresponding to the sensor element's 100b reference potential (of 2.5 V, for example) to be applied to the first terminal T1 as shown in FIG. 11. The conductive layer 400 (see FIG. 1) is electrically connected to the first terminal T1.

The sensor element 100b is an acceleration sensor element 100b that transforms acceleration into an electrical signal. In the sensor element 100b, the electrostatic capacitance of a capacitor including the fixed electrode 91A and the moving electrode 92b and the electrostatic capacitance of a capacitor including the fixed electrode 91B and the moving electrode 92b each vary according to the acceleration acting on the sensor element 100b in the X-axis direction.

Figure 9:
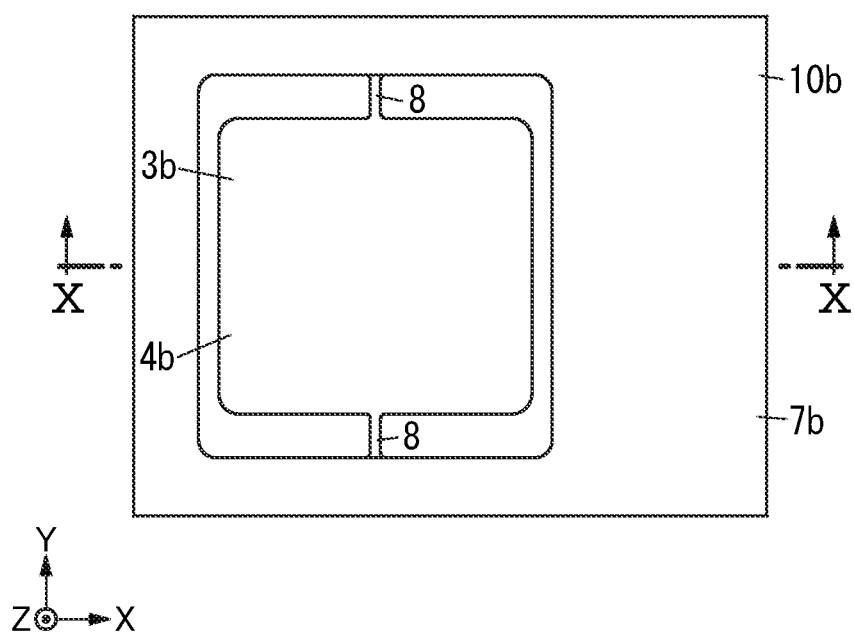
FIG. 9 is a plan view of a sensor element included in the sensor device.
Figure 10:
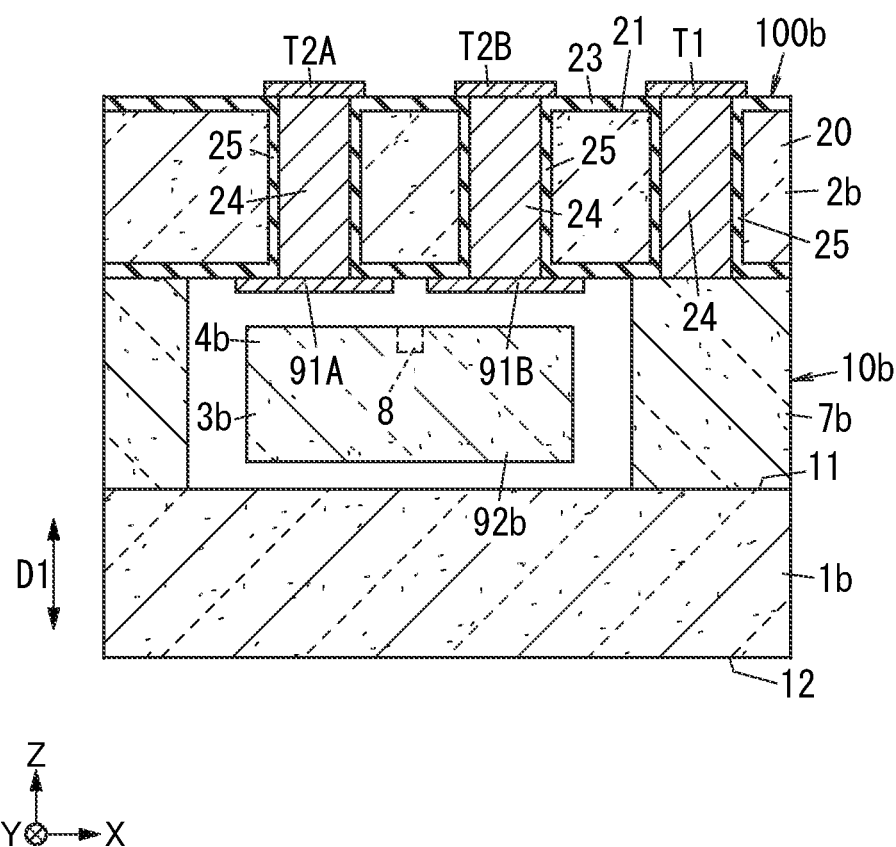
FIG. 10 is a cross-sectional view illustrating the sensor element of the sensor device and taken along the plane X-X shown in FIG. 9.

The sensor element 100b includes a fixed part 10b and a moving part 3b as shown in FIGS. 9-11. The fixed part 10b includes a first substrate 1b, a second substrate 2b, a supporting portion 7b, and a plurality of (e.g., two) fixed electrodes 91A, 91B. The moving part 3b is provided between, and out of contact with, the first substrate 1b and the second substrate 2b. The moving part 3b includes a weight 4b and a plurality of (e.g., two) beams 8. In the sensor element 100b, the weight 4b also serves as a moving electrode 92b. The sensor element 100b has a rectangular shape when viewed in plan in a thickness direction D1 defined for the first substrate 1b. The sensor element 100 does not have to be rectangular but may also be square, for example, when viewed in plan in the thickness direction D1 defined for the first substrate 1b.

In FIG. 9, illustration of the second substrate 2b is omitted. The fixed part 10b is fixed to the first substrate 1b. The moving part 3b is not fixed to the first substrate 1b.

In the following description, an orthogonal coordinate system with three axes that intersect with each other at right angles (namely, an X-axis, a Y-axis, and a Z-axis) is defined as an example. Particularly, the "Z-axis" is supposed to be an axis aligned with the thickness direction D1 defined for the first substrate 1b (and the thickness direction defined for the weight 4b), the "X-axis" is supposed to be an axis perpendicular to the thickness direction D1 and aligned with a direction perpendicular to the direction in which the two beams 8 are arranged, and the "Y-axis" is supposed to be an axis aligned with the direction in which the two beams 8 are arranged and is perpendicular to both the Z-axis and the X-axis. Note that each of the X-, Y-, and Z-axes is a virtual axis and the arrows indicating X, Y, and Z on the drawings are shown there just for the sake of convenience of description and are all insubstantial ones. The origin of this orthogonal coordinate system may be defined, for example, at the center of the moving part 3b (e.g., at the center of the weight 4b in the example illustrated in FIG. 9) when viewed in plan in the thickness direction D1 defined for the first substrate 1b.

The sensor element 100b may be designed to detect acceleration in the Z-axis direction as its target of detection. The sensor element 100b outputs an electrical signal representing the acceleration in the Z-axis direction. The two beams 8 of the sensor element 100b may be torsion beams that are deformable torsionally. The weight 4b is deformable, with respect to the supporting portion 7b, around a line that connects the two beams 8 together. That is to say, the weight 4b is movable around the Y-axis.

The first substrate 1b has a first principal surface 11 and a second principal surface 12, which is opposite from the first principal surface 11 as shown in FIGS. 8 and 10. The first substrate 1b may be, but does not have to be, rectangular, for example, and may also be square, when viewed in plan in the thickness direction D1 defined for the first substrate 1b. The first substrate 1b may include, for example, a first silicon substrate.

The second substrate 2b faces the first principal surface 11 of the first substrate 1b in the thickness direction D1 defined for the first substrate 1b as shown in FIGS. 8 and 10. When viewed in plan in the thickness direction D1 defined for the first substrate 1b, the second substrate 2b has the same shape as the first substrate 1b. The second substrate 2b may have different external dimensions from the first substrate 1b. The second substrate 2b may include, for example, a second silicon substrate 20. The second substrate 2b includes, for example, an insulating film 23 formed on a principal surface 21, opposite from the first substrate 1b, of the second silicon substrate 20, a plurality of terminals formed on the insulating film 23, and a plurality of through interconnects 24 formed along the thickness of the second silicon substrate 20 and connected one to one to the plurality of terminals. The plurality of terminals includes a first terminal T1 and second terminals T2A, T2B. The plurality of through interconnects 24 and the second silicon substrate 20 are electrically insulated from each other by an insulating film 25 (see FIG. 10) interposed between the through interconnects 24 and the second silicon substrate 20.

The supporting portion 7b is provided between the first substrate 1b and the second substrate 2b as shown in FIGS. 8 and 10. The supporting portion 7b has the shape of a frame aligned with the respective outer peripheral edges of the first substrate 1b and the second substrate 2b. The supporting portion 7b is fixed to the first substrate 1b and the second substrate 2b.

The supporting portion 7b may be electrically connected to, for example, an associated one (first terminal T1) of the plurality of terminals via an associated one 24 of the plurality of through interconnects 24. The supporting portion 7b supports the moving part 3b to allow the moving part 3b to swing.

The weight 4b is supported by the supporting portion 7b via the two beams 8 as shown in FIGS. 8-10 to be allowed to swing.

The IC chip 200b (see FIGS. 8 and 11) is an ASIC chip. The IC chip 200b is an Si-based IC chip. When viewed in plan in the thickness direction defined for the IC chip 200b, the IC chip 200b may be, but does not have to be, rectangular and may also be square, for example. The IC chip 200b has a first principal surface 201 and a second principal surface 202. The first principal surface 201 and the second principal surface 202 intersect with the thickness direction defined for the IC chip 200b.

The IC chip 200b includes a silicon substrate 203, a multilayer structure part 205, and a plurality of external connection terminals (pad electrodes). The silicon substrate 203 has a first surface 231 and a second surface 232 opposite from the first surface 231. The IC chip 200b includes, as a plurality of functional sections, a signal processor 211b, a first voltage generator 221, and a second voltage generator 222 (see FIGS. 8 and 11). In each of the plurality of functional sections (namely, the signal processor 211b, the first voltage generator 221, and the second voltage generator 222), part of the functional section is formed in the silicon substrate 203 and the rest of the functional section is included in the multilayer structure part 205. The IC chip 200b includes a control unit 210b including the signal processor 211b and a memory (see FIG. 11). The multilayer structure part 205 is formed on the first surface 231 of the silicon substrate 203. The multilayer structure part 205 includes an interconnection layer and a passivation film. The plurality of external connection terminals are electrically connected to their associated functional sections. The plurality of external connection terminals includes a first external connection terminal T21, second external connection terminals T22A, T22B, a fourth external connection terminal T24, and a fifth external connection terminal T25. The first external connection terminal T21 is connected to an output terminal of the second voltage generator 222. The second external connection terminals T22A, T22B are connected to a pair of input terminals of the signal processor 211b. The fourth external connection terminal T24 is connected to an input terminal of the first voltage generator 221. The fifth external connection terminal T25 is connected to the signal processor 211b. The fifth external connection terminal T25 is an external connection terminal, to which a ground potential is applied, out of the plurality of external connection terminals of the IC chip 200b. In other words, the fifth external connection terminal T25 is a ground electrode of the IC chip 200b.

The first principal surface 201 of the IC chip 200 includes the other surface, opposite from the surface in contact with the silicon substrate 203, of the multilayer structure part 205, and respective surfaces of the plurality of external connection terminals. The second principal surface 202 of the IC chip 200 includes the second surface 232 of the silicon substrate 203.

In the IC chip 200b, the first principal surface 201 of the IC chip 200b faces the second principal surface 12 of the first substrate 1b of the sensor element 100b. When viewed in plan in the thickness direction D1 defined for the first substrate 1b, the IC chip 200b may be, but does not have to be, rectangular and may also be square, for example. When viewed in plan in the thickness direction D1 defined for the first substrate 1b, the IC chip 200b has larger external dimensions than the sensor element 100b. When viewed in plan in the thickness direction D1 defined for the first substrate 1b, the outer peripheral edges 207 of the IC chip 200b are located outside of the outer peripheral edges 107 of the sensor element 100b. In other words, when viewed in plan in the direction in which the first principal surface 201 and second principal surface 202 of the IC chip 200b are arranged, the outer peripheral edges 207 of the IC chip 200b are located outside of the outer peripheral edges 107 of the sensor element 100b.

As shown in FIG. 11, the signal processor 211b is connected to the second terminal T2A of the sensor element 100b via the second external connection terminal T22A and a second connection member 602A. Thus, the signal processor 211b is connected to the fixed electrode 91A via the second external connection terminal T22A, the second connection member 602A, and the second terminal T2A. In addition, the signal processor 211b is also connected to the second terminal T2B of the sensor element 100b via the second external connection terminal T22B and a second connection member 602B. Thus, the signal processor 211b is connected to the fixed electrode 91B via the second external connection terminal T22B, the second connection member 602B, and the second terminal T2B. The signal processor 211b processes detection signals supplied from the second terminals T2A, T2B of the sensor element 100b. More specifically, the signal processor 211b converts an analog detection signal (electrical signal) supplied from the sensor element 100b into a digital signal and performs appropriate computational processing on the digital signal, thereby obtaining acceleration in the X-axis direction.

Each of the first connection member 601 and the second connection members 602A, 602B is an electrically conductive wire.

In the sensor device 500b, supposing that the electrostatic capacitance between the moving electrode 92b and the fixed electrode 91A and the electrostatic capacitance between the moving electrode 92b and the fixed electrode 91B in a state where no acceleration is applied in the X-axis direction and the weight 4b is standing still are C1 and C2, respectively, C1 is approximately equal to C2. On the other hand, supposing a variation in the electrostatic capacitance between the moving electrode 92b and the fixed electrode 91A and a variation in the electrostatic capacitance between the moving electrode 92b and the fixed electrode 91B when acceleration is applied in the X-axis direction to the sensor element 100b are $\Delta C1$ and $-\Delta C2$, respectively, $\Delta C1$ is approximately equal to $\Delta C2$.

In the sensor device 500*b*, the signal processor 211*b* of the IC chip 200*b* calculates the acceleration in the X-axis direction based on the differential value (≅ΔC1+ΔC2) between the electrostatic capacitance formed between the moving electrode 92*b* and the fixed electrode 91A and the electrostatic capacitance formed between the moving electrode 92*b* and the fixed electrode 91B.

The sensor device 500*b* according to the third embodiment includes the conductive layer 400 interposed between the first principal surface 201 of the IC chip 200*b* and the sensor element 100*b* and facing the sensor element 100*b* via the resin-based adhesive layer 300. The conductive layer 400 is electrically connected to the first terminal T1 that is connected to the moving electrode 92*b*. This allows the sensor device 500*b* according to the third embodiment to reduce a variation in the capacitance value of a coupled capacitor between the sensor element 100*b* and the IC chip 200*b* due to a variation with time in the material properties of the resin-based adhesive layer 300, thus enabling reducing a variation in the sensor characteristics of the sensor element 100*b*. Thus, the sensor device 500*b* according to the third embodiment may contribute to improving the reliability.

(Variations)

The first to third embodiments described above are only exemplary ones of various embodiments of the present disclosure and should not be construed as limiting. Rather, the first to third exemplary embodiments may be readily modified in various manners depending on a design choice or any other factor without departing from the scope of the present disclosure.

The outer peripheral shape of the weight 4 as viewed in plan in the thickness direction D1 defined for the first substrate 1 does not have to be a polygonal shape but may also be a disklike shape, for example.

Also, in the sensor element 100, the structure including the first substrate 1 and the supporting portions 7 does not have to be formed using an SOI wafer but may also be formed by MEMS manufacturing technology and anodic bonding technique using a silicon wafer and a glass wafer, for example. A material for the glass wafer may be, for example, borosilicate glass.

Furthermore, the structure including the first substrate 1, the moving part 3, and the supporting portions 7 does not have to be formed using an SOI wafer but may also be formed using a bonding technique for bonding two silicon wafers together.

Furthermore, the respective shapes of the plurality of first elastic portions 51 and the plurality of second elastic portions 52 do not have to be the ones illustrated on the drawings.

Furthermore, the plurality of first elastic portions 51 and the plurality of second elastic portions 52 do not have to be springs but may also be any other type of elastic members. The number of the first elastic portions 51 provided and the number of the second elastic portions 52 provided may be changed as appropriate.

Furthermore, the first elastic portions 51 and the second elastic portions 52 do not have to be made of silicon but may also be made of, for example, a metal, an alloy, an electrically conductive resin, or any other suitable material.

Furthermore, when viewed in plan in the thickness direction D1 defined for the first substrate 1, the frame portions 6 do not have to be completely closed frames but may also have a partially cutout shape such as a C-frame or a U-frame. Also, not all the frame portions 6 need to have the same shape but some frame portion(s) 6 may have a different shape from the other frame portion(s) 6.

Optionally, the sensor device 500 may include a plurality of weights 4.

Furthermore, the acceleration sensor element 100*b* does not have to have the shape of a beam supported at both ends but may also have a cantilever shape.

(Aspects)

A sensor device (500; 500*a*; 500*b*) according to a first aspect includes an IC chip (200; 200*b*), a sensor element (100; 100*b*), a resin-based adhesive layer (300), and a conductive layer (400). The IC chip (200; 200*b*) has a first principal surface (201) and a second principal surface (202). The sensor element (100; 100*b*) is disposed over the first principal surface (201) of the IC chip (200; 200*b*). The resin-based adhesive layer (300) is interposed between the first principal surface (201) of the IC chip (200; 200*b*) and the sensor element (100; 100*b*). The conductive layer (400) is interposed between the first principal surface (201) of the IC chip (200; 200*b*) and the sensor element (100; 100*b*) and faces the sensor element (100; 100*b*) via the resin-based adhesive layer (300). The sensor element (100; 100*b*) includes: a moving part (3; 3*b*) including a moving electrode (92; 92*b*); a fixed part (10; 10*b*) including a fixed electrode (91; 91A, 91B) that forms electrostatic capacitance between the moving electrode (92; 92*b*) and the fixed electrode (91; 91A, 91B) itself; a first terminal (T1) connected to the moving electrode (92; 92*b*); and a second terminal (T2; T2A, T2B) connected to the fixed electrode (91; 91A, 91B). The IC chip (200; 200*b*) includes: a signal processor (211; 211*b*) that processes a detection signal supplied from the second terminal (T2; T2A, T2B); a first voltage generator (221) that generates a first voltage as an operating voltage for the signal processor (211; 211*b*); and a second voltage generator (222) that generates a second voltage corresponding to the sensor element's (100; 100*b*) reference potential to be applied to the first terminal (T1). The conductive layer (400) is electrically connected to the first terminal (T1).

The sensor device (500; 500*a*; 500*b*) according to the first aspect may reduce a variation in the sensor characteristics of the sensor element (100; 100*b*).

In a sensor device (500; 500*a*) according to a second aspect, which may be implemented in conjunction with the first aspect, the sensor element (100) is an angular velocity sensor element (100). The fixed part (10) further includes a driving electrode (81) that drives the moving part (3; 3*b*). The sensor element (100) further includes a third terminal (T3) connected to the driving electrode (81). The IC chip (200) further includes a driving controller (212) that outputs a drive signal to the third terminal (T3).

The sensor device (500; 500*a*) according to the second aspect may reduce a variation in the sensor characteristics of the angular velocity sensor element (100).

In a sensor device (500; 500*a*) according to a third aspect, which may be implemented in conjunction with the second aspect, the second voltage is larger than the first voltage.

The sensor device (500; 500*a*) according to the third aspect may reduce the chances of the angular velocity sensor element (100) losing stability of its operation.

In a sensor device (500; 500*a*) according to a fourth aspect, which may be implemented in conjunction with the third aspect, the second voltage generator (222) includes a charge pump circuit that generates the second voltage by boosting the first voltage supplied from the first voltage generator (221).

In the sensor device (500; 500*a*) according to the fourth aspect, the second voltage generator (222) includes a charge pump circuit. This enables boosting the first voltage to the second voltage without using any inductor, thus reducing the frequency of occurrence of electromagnetic noise.

In a sensor device (500; 500a; 500b) according to a fifth aspect, which may be implemented in conjunction with any one of the first to fourth aspects, when viewed in plan in a direction in which the first principal surface (201) and the second principal surface (202) of the IC chip (200; 200b) are arranged, outer peripheral edges (407) of the conductive layer (400) are located outside of outer peripheral edges (107) of the sensor element (100; 100b).

The sensor device (500; 500a; 500b) according to the fifth aspect may reduce capacitance coupling between the sensor element (100; 100b) and the IC chip (200; 200b).

A sensor device (500; 500a; 500b) according to a sixth aspect, which may be implemented in conjunction with any one of the first to fifth aspects, further includes an insulating layer (410) and a second conductive layer (402). The insulating layer (410) is interposed between a first conductive layer (400) as the conductive layer (400) and the first principal surface (201) of the IC chip (200; 200b). The second conductive layer (402) is interposed between the insulating layer (410) and the first principal surface (201) of the IC chip (200; 200b) and faces the first conductive layer (400) via the insulating layer (410). The IC chip (200; 200b) includes a ground electrode (fifth external connection terminal T25). The second conductive layer (402) is electrically connected to the ground electrode (fifth external connection terminal T25) of the IC chip (200; 200b).

The sensor device (500; 500a; 500b) according to the sixth aspect makes it easier to stabilize the potential at the first conductive layer (400).

A sensor device (500; 500a; 500b) according to a seventh aspect, which may be implemented in conjunction with any one of the first to fifth aspects, further includes an insulating layer (410) and a second conductive layer (402). The insulating layer (410) is interposed between a first conductive layer (400) as the conductive layer (400) and the first principal surface (201) of the IC chip (200; 200b). The second conductive layer (402) is interposed between the insulating layer (410) and the first principal surface (201) of the IC chip (200; 200b) and faces the first conductive layer (400) via the insulating layer (410). The IC chip (200; 200b) includes an operating voltage electrode (sixth external connection terminal T26) to which the operating voltage is applied. The second conductive layer (402) is electrically connected to the operating voltage electrode (sixth external connection terminal T26) of the IC chip (200; 200b).

The sensor device (500; 500a; 500b) according to the seventh aspect makes it easier to stabilize the potential at the first conductive layer (400).

Note that the constituent elements according to the second to seventh aspects are not essential constituent elements for the sensor device (500; 500a; 500b) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A sensor device comprising:
an IC chip having a first principal surface and a second principal surface;
a sensor element disposed over the first principal surface of the IC chip;
a resin-based adhesive layer interposed between the first principal surface of the IC chip and the sensor element; and
a conductive layer interposed between the first principal surface of the IC chip and the sensor element and facing the sensor element via the resin-based adhesive layer,
the sensor element including:
a moving part including a moving electrode;
a fixed part including a fixed electrode configured to form electrostatic capacitance between the moving electrode and the fixed electrode itself;
a first terminal connected to the moving electrode; and
a second terminal connected to the fixed electrode,
the IC chip including:
a signal processor configured to process a detection signal supplied from the second terminal;
a first voltage generator configured to generate a first voltage as an operating voltage for the signal processor; and
a second voltage generator configured to generate a second voltage corresponding to the sensor element's reference potential to be applied to the first terminal,
the conductive layer being electrically connected to the first terminal.

2. The sensor device of claim 1, wherein
the sensor element is an angular velocity sensor element,
the fixed part further includes a driving electrode arranged to drive the moving part,
the sensor element further includes a third terminal connected to the driving electrode, and
the IC chip further includes a driving controller configured to output a drive signal to the third terminal.

3. The sensor device of claim 2, wherein
the second voltage is larger than the first voltage.

4. The sensor device of claim 3, wherein
the second voltage generator includes a charge pump circuit configured to generate the second voltage by boosting the first voltage supplied from the first voltage generator.

5. The sensor device of claim 1, wherein
when viewed in plan in a direction in which the first principal surface and the second principal surface of the IC chip are arranged, outer peripheral edges of the conductive layer are located outside of outer peripheral edges of the sensor element.

6. The sensor device of claim 1, further comprising:
an insulating layer interposed between a first conductive layer as the conductive layer and the first principal surface of the IC chip; and
a second conductive layer interposed between the insulating layer and the first principal surface of the IC chip and facing the first conductive layer via the insulating layer, wherein
the IC chip includes a ground electrode, and
the second conductive layer is electrically connected to the ground electrode of the IC chip.

7. The sensor device of claim 1, further comprising:
an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes an operating voltage electrode to which the operating voltage is applied, and the second conductive layer is electrically connected to the operating voltage electrode of the IC chip.

8. The sensor device of claim 2, wherein when viewed in plan in a direction in which the first principal surface and the second principal surface of the IC chip are arranged, outer peripheral edges of the conductive layer are located outside of outer peripheral edges of the sensor element.

9. The sensor device of claim 3, wherein when viewed in plan in a direction in which the first principal surface and the second principal surface of the IC chip are arranged, outer peripheral edges of the conductive layer are located outside of outer peripheral edges of the sensor element.

10. The sensor device of claim 4, wherein when viewed in plan in a direction in which the first principal surface and the second principal surface of the IC chip are arranged, outer peripheral edges of the conductive layer are located outside of outer peripheral edges of the sensor element.

11. The sensor device of claim 2, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes a ground electrode, and the second conductive layer is electrically connected to the ground electrode of the IC chip.

12. The sensor device of claim 3, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes a ground electrode, and the second conductive layer is electrically connected to the ground electrode of the IC chip.

13. The sensor device of claim 4, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes a ground electrode, and the second conductive layer is electrically connected to the ground electrode of the IC chip.

14. The sensor device of claim 5, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes a ground electrode, and the second conductive layer is electrically connected to the ground electrode of the IC chip.

15. The sensor device of claim 8, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes a ground electrode, and the second conductive layer is electrically connected to the ground electrode of the IC chip.

16. The sensor device of claim 9, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes a ground electrode, and the second conductive layer is electrically connected to the ground electrode of the IC chip.

17. The sensor device of claim 10, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes a ground electrode, and the second conductive layer is electrically connected to the ground electrode of the IC chip.

18. The sensor device of claim 2, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes an operating voltage electrode to which the operating voltage is applied, and the second conductive layer is electrically connected to the operating voltage electrode of the IC chip.

19. The sensor device of claim 3, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes an operating voltage electrode to which the operating voltage is applied, and the second conductive layer is electrically connected to the operating voltage electrode of the IC chip.

20. The sensor device of claim 4, further comprising:

an insulating layer interposed between a first conductive layer as the conductive layer and the first principal surface of the IC chip; and a second conductive layer interposed between the insulating layer and the first principal surface of the IC chip and facing the first conductive layer via the insulating layer, wherein the IC chip includes an operating voltage electrode to which the operating voltage is applied, and the second conductive layer is electrically connected to the operating voltage electrode of the IC chip.

* * * * *